(12) United States Patent
Ide

(10) Patent No.: US 12,431,317 B2
(45) Date of Patent: Sep. 30, 2025

(54) SLIDING BEARING UNIT AND ROTARY ANODE TYPE X-RAY TUBE

(71) Applicant: CANON ELECTRON TUBES & DEVICES CO., LTD., Otawara (JP)

(72) Inventor: Hideki Ide, Otawara (JP)

(73) Assignee: CANON ELECTRON TUBES & DEVICES CO., LTD., Otawara (JP)

( * ) Notice: Subject to any disclaimer, the term of this patent is extended or adjusted under 35 U.S.C. 154(b) by 433 days.

(21) Appl. No.: 17/950,172

(22) Filed: Sep. 22, 2022

(65) Prior Publication Data

US 2023/0018791 A1 Jan. 19, 2023

Related U.S. Application Data

(63) Continuation of application No. PCT/JP2020/027169, filed on Jul. 10, 2020.

(30) Foreign Application Priority Data

Mar. 25, 2020 (JP) ................ 2020-054328

(51) Int. Cl.
| | | |
|---|---|---|
| *H01J 35/10* | (2006.01) | |
| *F16C 17/10* | (2006.01) | |
| *F16C 33/10* | (2006.01) | |

(52) U.S. Cl.
CPC ........ *H01J 35/1017* (2019.05); *F16C 17/107* (2013.01); *F16C 33/107* (2013.01); *F16C 2240/40* (2013.01); *H01J 2235/106* (2013.01)

(58) Field of Classification Search
CPC ................ F16C 2380/16; F16C 33/109; F16C 33/1085; F16C 33/1025; F16C 33/107;
(Continued)

(56) References Cited

U.S. PATENT DOCUMENTS

| | | | | |
|---|---|---|---|---|
| 5,602,898 A | * | 2/1997 | Vetter | ............. F16C 17/107 378/132 |
| 6,430,261 B1 | * | 8/2002 | Bathe | ............. F16C 32/0427 378/132 |

(Continued)

FOREIGN PATENT DOCUMENTS

| | | |
|---|---|---|
| CN | 1293447 A | 5/2001 |
| CN | 101553896 A | 10/2009 |

(Continued)

OTHER PUBLICATIONS

English translation of JP-2011060517-A (Year: 2011).*
(Continued)

*Primary Examiner* — David J Makiya
*Assistant Examiner* — Soorena Kefayati
(74) *Attorney, Agent, or Firm* — Oblon, McClelland, Maier & Neustadt, L.L.P.

(57) ABSTRACT

According to one embodiment, a sliding bearing unit includes a stationary shaft including a first radial bearing surface, a rotor, and a lubricant. The rotor includes a first cylinder and a second cylinder. The second cylinder includes a second radial bearing surface and is restricted in operation so that it does not rotate relative to the first cylinder. The lubricant, together with the first radial bearing surface and the second radial bearing surface, forms a dynamic pressure radial sliding bearing.

23 Claims, 19 Drawing Sheets

(58) Field of Classification Search
CPC ........ F16C 37/002; F16C 23/10; F16C 17/10; F16C 17/107; F16C 17/08
See application file for complete search history.

(56) References Cited

U.S. PATENT DOCUMENTS

| | | | | |
|---|---|---|---|---|
| 6,430,262 | B1* | 8/2002 | Panasik | F16C 25/083 378/123 |
| 6,477,236 | B1* | 11/2002 | Anno | H01J 35/107 378/127 |
| 7,127,034 | B1* | 10/2006 | Lee | H01J 35/10 378/119 |
| 7,343,002 | B1* | 3/2008 | Lee | F16C 33/66 378/132 |
| 2002/0006183 | A1* | 1/2002 | Ide | H01J 35/104 378/132 |
| 2003/0091148 | A1* | 5/2003 | Bittner | H01J 35/16 378/128 |
| 2004/0234033 | A1* | 11/2004 | Anno | H01J 35/10 378/133 |
| 2009/0080616 | A1* | 3/2009 | Yoshii | H01J 35/104 378/133 |
| 2009/0225950 | A1* | 9/2009 | Yonezawa | H01J 35/106 378/133 |
| 2010/0166149 | A1* | 7/2010 | Okamura | F16C 33/103 148/579 |
| 2011/0002564 | A1* | 1/2011 | Essensohn | F16C 33/109 384/100 |
| 2011/0007877 | A1* | 1/2011 | Legall | H01J 35/104 445/28 |
| 2011/0280376 | A1* | 11/2011 | Behling | H01J 35/107 378/132 |
| 2012/0106712 | A1* | 5/2012 | Hunt | H01J 9/18 378/132 |
| 2013/0129264 | A1* | 5/2013 | Watanabe | C10M 159/18 508/108 |
| 2014/0355743 | A1* | 12/2014 | Hunt | H01J 35/107 384/112 |
| 2016/0047415 | A1* | 2/2016 | Hunt | H01J 35/104 384/372 |
| 2017/0097049 | A1* | 4/2017 | Bachmaan | F16C 33/125 |
| 2018/0223908 | A1* | 8/2018 | Hunt | F16C 33/72 |
| 2020/0013577 | A1* | 1/2020 | Hunt | F16C 33/109 |
| 2021/0231167 | A1* | 7/2021 | Triscari | F16C 17/107 |

FOREIGN PATENT DOCUMENTS

| | | | | |
|---|---|---|---|---|
| CN | 107430969 A | | 12/2017 | |
| CN | 107620768 A | | 1/2018 | |
| EP | 2 099 055 A1 | | 9/2009 | |
| JP | 08-241686 A | | 9/1996 | |
| JP | 2003-203590 A | | 7/2003 | |
| JP | 2006-085995 A | | 3/2006 | |
| JP | 2009-283421 A | | 12/2009 | |
| JP | 2011060517 A | * | 3/2011 | ............ H01J 35/101 |
| JP | 2011-249244 A | | 12/2011 | |
| JP | 2012-510136 A | | 4/2012 | |
| JP | 2012104402 A | | 5/2012 | |

OTHER PUBLICATIONS

International Search Report issued Sep. 24, 2020 in PCT/JP2020/027169 filed on Jul. 10, 2020, 2 pages.
Office Action issued Mar. 25, 2025 in Chinese Application No. 202080098981.1, with computer generated English translation.

* cited by examiner

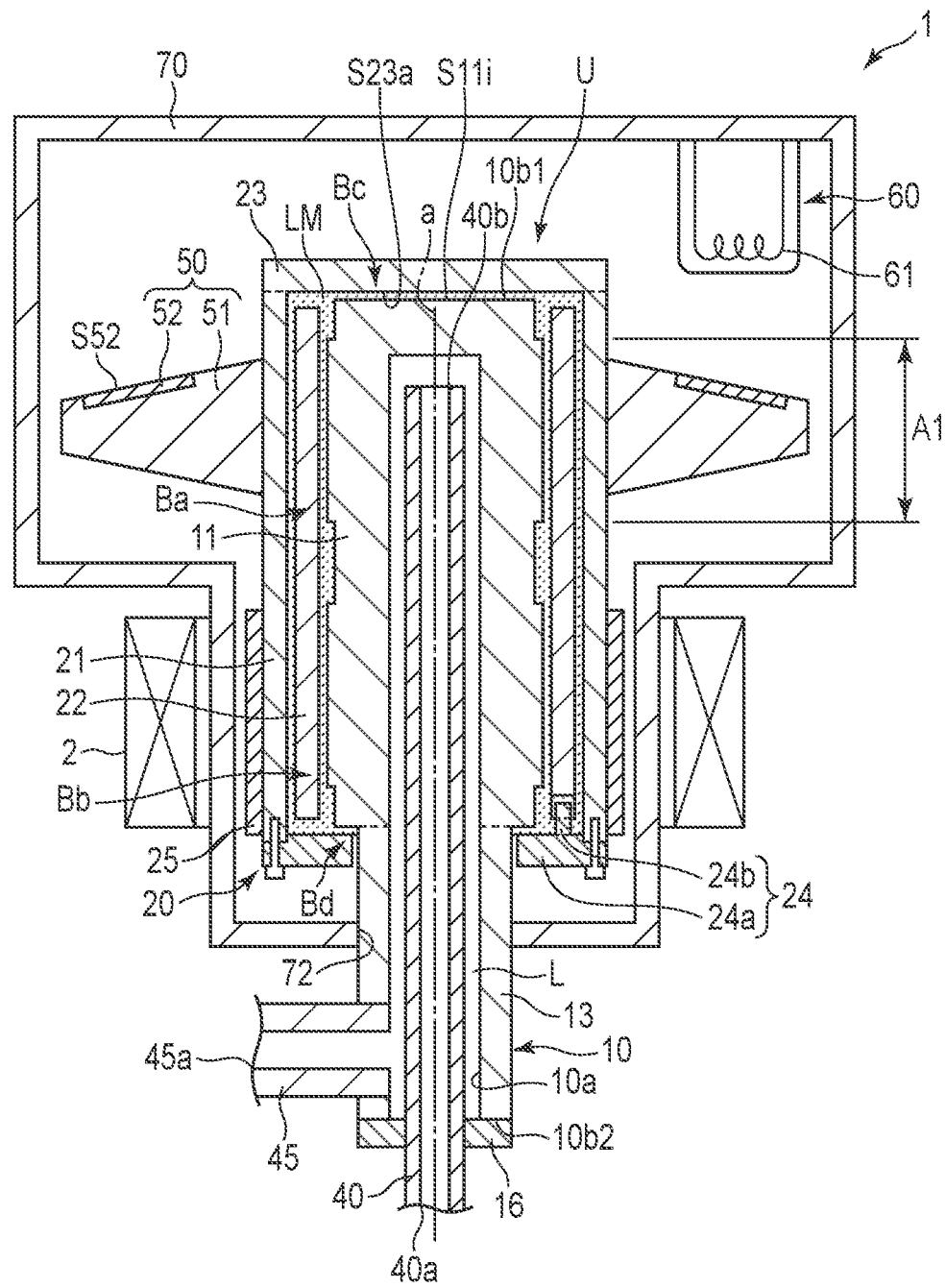
F I G. 20

SLIDING BEARING UNIT AND ROTARY ANODE TYPE X-RAY TUBE

CROSS-REFERENCE TO RELATED APPLICATIONS

This application is a Continuation Application of PCT Application No. PCT/JP2020/027169, filed Jul. 10, 2020 and based upon and claiming the benefit of priority from Japanese Patent Application No. 2020-054328, filed Mar. 25, 2020, the entire contents of all of which are incorporated herein by reference.

FIELD

Embodiments described herein relate generally to a sliding bearing unit and a rotating anode X-ray tube.

BACKGROUND

Generally, an X-ray tube assembly is used as an X-ray source in medical and industrial equipment that uses X-rays to diagnose a subject. As the X-ray tube assembly, a rotating anode X-ray tube assembly including a rotating anode type X-ray tube is known.

The rotating anode X-ray tube assembly comprises a rotating anode X-ray tube that emits X-rays, a stator coil, and a housing that houses the rotating anode X-ray tube and stator coil. The rotating anode X-ray tube comprises a stationary shaft, a cathode that generates electrons, an anode target, a rotor, and an envelope. The rotor is formed in a cylindrical shape. The anode target is fixed to the rotor. A gap between the stationary shaft and the rotor is filled with a lubricant. The rotating anode X-ray tube uses dynamic pressure sliding bearings. The rotor rotates with the anode target due to a magnetic field generated by the stator coil. Furthermore, X-rays are emitted when electrons emitted from the cathode collide with the anode target.

BRIEF DESCRIPTION OF THE DRAWINGS

FIG. 20 is a cross-sectional view showing an X-ray tube assembly according to a tenth embodiment.

DETAILED DESCRIPTION

Figure 1:
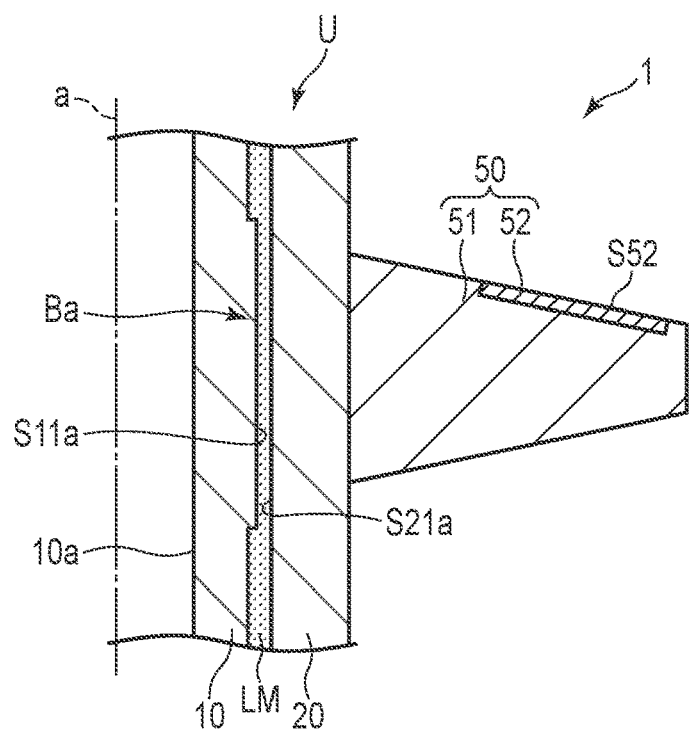
FIG. 1 is an enlarged cross-sectional view showing a part of an X-ray tube in Comparative Example 1, showing a state before heat is input to an anode target.

In general, according to one embodiment, there is provided a sliding bearing unit comprising: a stationary shaft that extends along a rotation axis and includes a first radial bearing surface on an outer peripheral surface; a rotor that is rotatable around the stationary shaft; and a lubricant. The rotor includes: a first cylinder extending along the rotation axis and formed in a tubular shape, and located surrounding the stationary shaft; and a second cylinder extending along the rotation axis and formed in a tubular shape, located between the stationary shaft and the first cylinder, including a second radial bearing surface on an inner peripheral surface, and whose operation is restricted so as not to rotate relative to the first cylinder. The lubricant is filled in a plurality of gaps between the stationary shaft, the first cylinder, and the second cylinder, and forms a dynamic pressure radial sliding bearing together with the first radial bearing surface and the second radial bearing surface.

According to another embodiment, there is provided a rotating anode X-ray tube comprising: a sliding bearing unit comprising a stationary shaft extending along a rotation axis and including a first radial bearing surface on an outer peripheral surface, a rotor rotatable around the stationary shaft, and a lubricant; an anode target; a cathode arranged facing the anode target; and an envelope housing the sliding bearing unit, the anode target, and the cathode, and fixing the stationary shaft. The rotor includes: a first cylinder extending along the rotation axis and formed in a tubular shape, and located surrounding the stationary shaft; and a second cylinder extending along the rotation axis and formed in a tubular shape, located between the stationary shaft and the first cylinder, including a second radial bearing surface on an inner peripheral surface, and whose operation is restricted so as not to rotate relative to the first cylinder. The lubricant is filled in a plurality of gaps between the stationary shaft, the first cylinder, and the second cylinder, and forms a dynamic pressure radial sliding bearing together with the first radial bearing surface and the second radial bearing surface. The anode target surrounds an outer peripheral surface of the first cylinder, and is fixed to the first cylinder.

Embodiments and comparative examples will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In each of the following embodiments and comparative examples, a sliding bearing unit and a rotating anode X-ray tube assembly comprising this sliding bearing unit are described. The rotating anode X-ray tube assembly comprises a rotating anode X-ray tube and the like. Hereinafter, the rotating anode X-ray tube assembly is simply referred to as an X-ray tube assembly, and the rotating anode X-ray tube is simply referred to as an X-ray tube. The X-ray tube comprises the sliding bearing unit, an anode target, a cathode, and an envelope. The sliding bearing unit comprises a stationary shaft, a rotor, and a liquid metal (metal lubricant) as a lubricant, and uses a sliding bearing.

Comparative Example 1

Figure 2:
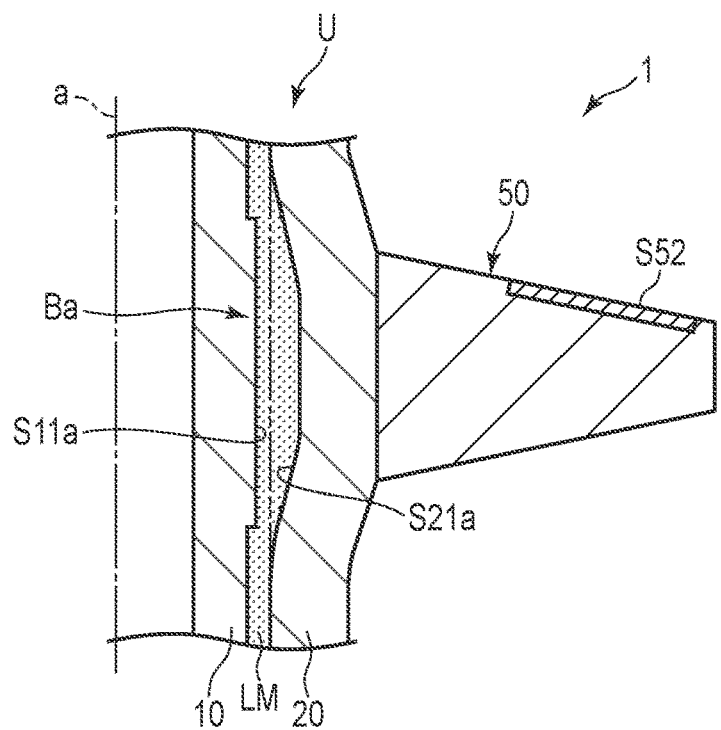
FIG. 2 is an enlarged cross-sectional view showing a part of the X-ray tube of Comparative Example 1 above, showing a state until which heat is input to the anode target and the anode target is cooled.

First, an X-ray tube assembly according to Comparative Example 1 will be described. FIG. 1 is an enlarged cross-sectional view showing a part of an X-ray tube 1 of Comparative Example 1, and shows a state before heat is input to an anode target 50. FIG. 2 is an enlarged cross-sectional view showing a part of the X-ray tube 1 of Comparative Example 1, and shows a state until which heat is input to the anode target 50 and the anode target 50 is cooled.

As shown in FIG. 1, the X-ray tube assembly according to Comparative Example 1 comprises the X-ray tube 1. The X-ray tube 1 comprises a sliding bearing unit U, the anode target 50, and the like. The sliding bearing unit U comprises a stationary shaft 10, a rotor 20, a liquid metal LM, and the like.

The stationary shaft 10 is formed in a tubular shape and extends along a rotation axis a. A radial bearing surface S11a is formed on an outer peripheral surface of the stationary shaft 10. The rotor 20 is formed in a tubular shape, extends along the rotation axis a, and surrounds the stationary shaft 10. A radial bearing surface S21a is formed on an inner peripheral surface of the rotor 20. The liquid metal LM is filled in a gap between the stationary shaft 10 and the rotor 20. The liquid metal LM forms a dynamic pressure radial sliding bearing Ba together with the radial bearing surface S11a and the radial bearing surface S21a.

The anode target 50 has an anode target main body 51 and a target layer 52 provided on a part of an outer surface of the anode target main body 51. The anode target main body 51 has an annular shape, is connected to an outer peripheral surface of the rotor 20, is fixed to the rotor 20, and is integrated with the rotor 20. The target layer 52 has a target surface (electron collision surface) S52 on which electrons emitted from a cathode collide.

The potential of the rotor 20 and the stationary shaft 10 is the same as that of the anode target 50. In the case of an anode grounded X-ray tube, the anode target 50, the rotor 20, the stationary shaft 10, and the metal part of an envelope (not shown) have a grounding potential.

In an operating state of the X-ray tube 1, the rotor 20 and the anode target 50 rotate together. Furthermore, the cathode irradiates an electron beam to the anode target 50. As a result, the anode target 50 emits X-rays when it collides with an electron.

When the target surface S52 is continuously irradiated with the electron beam for a certain period of time, heat is accumulated in the anode target 50, and the temperature of the target surface S52 rises. When the amount of heat generated by the electron beam exceeds the heat capacity of the anode target 50 and exceeds the allowable temperature of the anode target 50, there is a problem that the target surface S52 starts to be damaged. This problem is solved by increasing the size of the anode target 50 and increasing the heat capacity of the anode target 50. Increasing the size of the anode target 50 also has the effect of increasing the cooling rate of the anode target 50 by radiation.

However, as the size of the anode target 50 increases, the size, weight, and cost of the X-ray tube 1 increase. Therefore, in order to solve the above problem, it is not a preferable means to increase the size of the anode target 50.

Therefore, by using the liquid metal LM of the dynamic pressure sliding bearing (radial sliding bearing Ba) as a heat transfer medium, heat is transferred from the anode target 50 to the stationary shaft 10, and the heat can be transferred to a coolant flowing through a heat transfer portion 10a formed inside of the stationary shaft 10. The heat generated in the anode target 50 can be removed by the above cooling means. In order to improve the cooling performance, it is necessary to increase the heat transfer rate from the anode target 50 to the stationary shaft 10. Therefore, the anode target 50 is firmly coupled to the rotor 20.

As shown in FIG. 2, however, stress due to thermal expansion when the anode target 50 is at a high temperature propagates to the rotor 20. Note that the heat (heat energy) generated by the collision of electrons with the target surface S52 is transferred from the target surface S52 to the inside of the target layer 52, a portion of the anode target main body 51 close to the target layer 52, and a portion of the anode target main body 51 close to the rotor 20 in this order, and the temperature of the anode target 50 rises. Therefore, in the X-ray tube 1 of Comparative Example 1, when the anode target main body 51 is at a high temperature, the gap (bearing gap) between the radial bearing surface S11 and the radial bearing surface S21a changes (enlarges), causing the performance of the radial sliding bearing Ba to deteriorate.

Comparative Example 2

Figure 3:
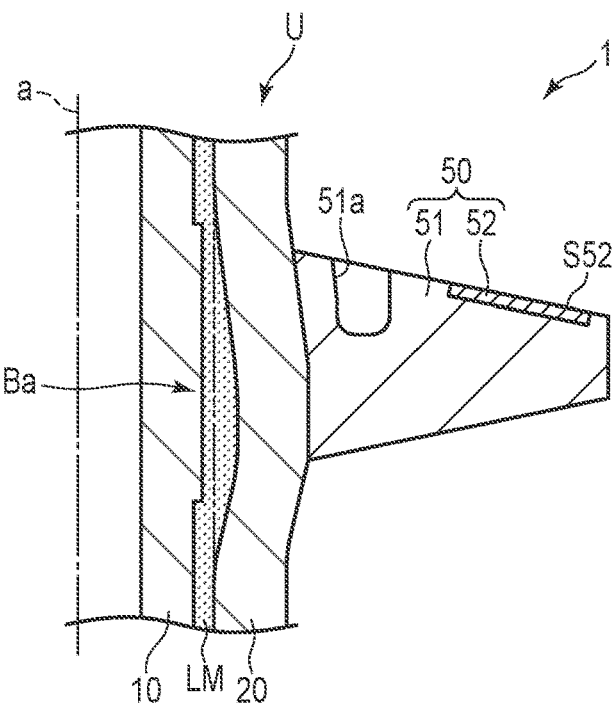
FIG. 3 is an enlarged cross-sectional view showing a part of an X-ray tube of Comparative Example 2, showing a state until which heat is input to an anode target and the anode target is cooled.

Next, an X-ray tube assembly according to Comparative Example 2 will be described. FIG. 3 is an enlarged cross-sectional view showing a part of an X-ray tube 1 of Comparative Example 2, and shows a state until which heat is input to an anode target 50 and the anode target 50 is cooled.

As shown in FIG. 3, an anode target main body 51 has a circumferential notch 51a. The notch 51a is located at the root of the anode target main body 51, and is located on an inner peripheral side of a target layer 52. By forming the notch 51*a* in the anode target main body 51, an adverse effect of a thermal expansion of the anode target 50 on the rotor 20 can be reduced in comparison to a case where the notch 51*a* is not formed in the anode target main body 51.

However, since the anode target 50 is firmly coupled to a rotor 20, the adverse effect of the thermal expansion of the anode target 50 on the rotor 20 remains strong. Therefore, even in the X-ray tube 1 of Comparative Example 2, the performance of a radial sliding bearing Ba is deteriorated as in the case of the X-ray tube 1 of Comparative Example 1.

Comparative Example 3

Figure 4:
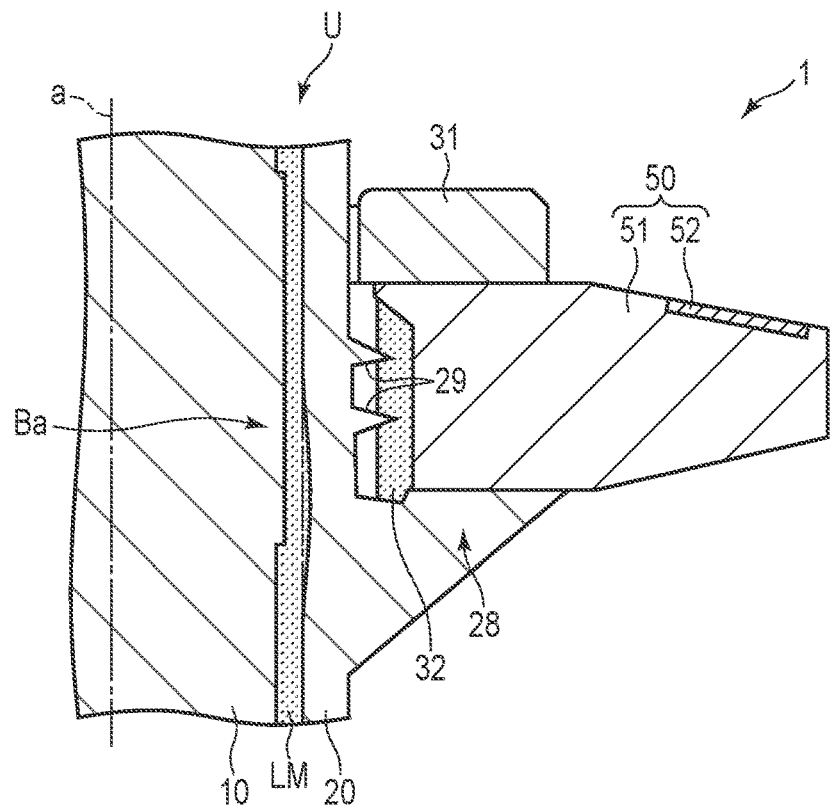
FIG. 4 is an enlarged cross-sectional view showing a part of an X-ray tube of Comparative Example 3, showing a state until which heat is input to an anode target and the anode target is cooled.

Next, an X-ray tube assembly according to Comparative Example 3 will be described. FIG. 4 is an enlarged cross-sectional view showing a part of an X-ray tube 1 of Comparative Example 3, and shows a state until which heat is input to an anode target 50 and the anode target 50 is cooled.

As shown in FIG. 4, a stationary shaft 10 is formed in a columnar shape. An anode target main body 51 is held in a state of being pressed against a protruding portion 28 of a rotor 20 by a nut 31 of the X-ray tube 1. From the above, the anode target 50 is fixed to the rotor 20. The anode target main body 51 is located at intervals from the rotor 20 in a radial direction of the anode target 50. A protrusion 29 is formed on the outer peripheral surface side of the rotor 20. The protrusion 29 extends toward the anode target main body 51 and is not in contact with the anode target main body 51. A liquid contact material 32 of the X-ray tube 1 is enclosed in a space surrounded by the rotor 20, the anode target 50, and the nut 31. Heat generated in the anode target 50 can be transferred to the rotor 20 via the liquid contact material 32.

As described above, the anode target main body 51 is located at intervals from the rotor 20 in the radial direction of the anode target 50. Therefore, it is possible to reduce an adverse effect of the thermal expansion of the anode target 50 on the rotor 20 while transferring the heat generated in the anode target 50 to the rotor 20.

However, the structure of the X-ray tube 1 in Comparison Example 3 is complicated. Furthermore, since the anode target 50 is firmly coupled to the rotor 20, the adverse effect of the thermal expansion of the anode target 50 on the rotor 20 remains. Therefore, even in the X-ray tube 1 of Comparative example 3, the performance of the radial sliding bearing Ba is deteriorated as in the case of the X-ray tube 1 of Comparative Examples 1 and 2.

As can be seen from Comparative Examples 1 to 3 described above, there is a demand for an X-ray tube 1 in which the thermal expansion of the anode target 50 does not adversely affect the bearing. Furthermore, there is a demand for a sliding bearing unit U and an X-ray tube 1 capable of obtaining a good bearing operation. Furthermore, there is a demand for an X-ray tube 1 that is compact and has excellent thermal characteristics.

First Embodiment

Figure 5:
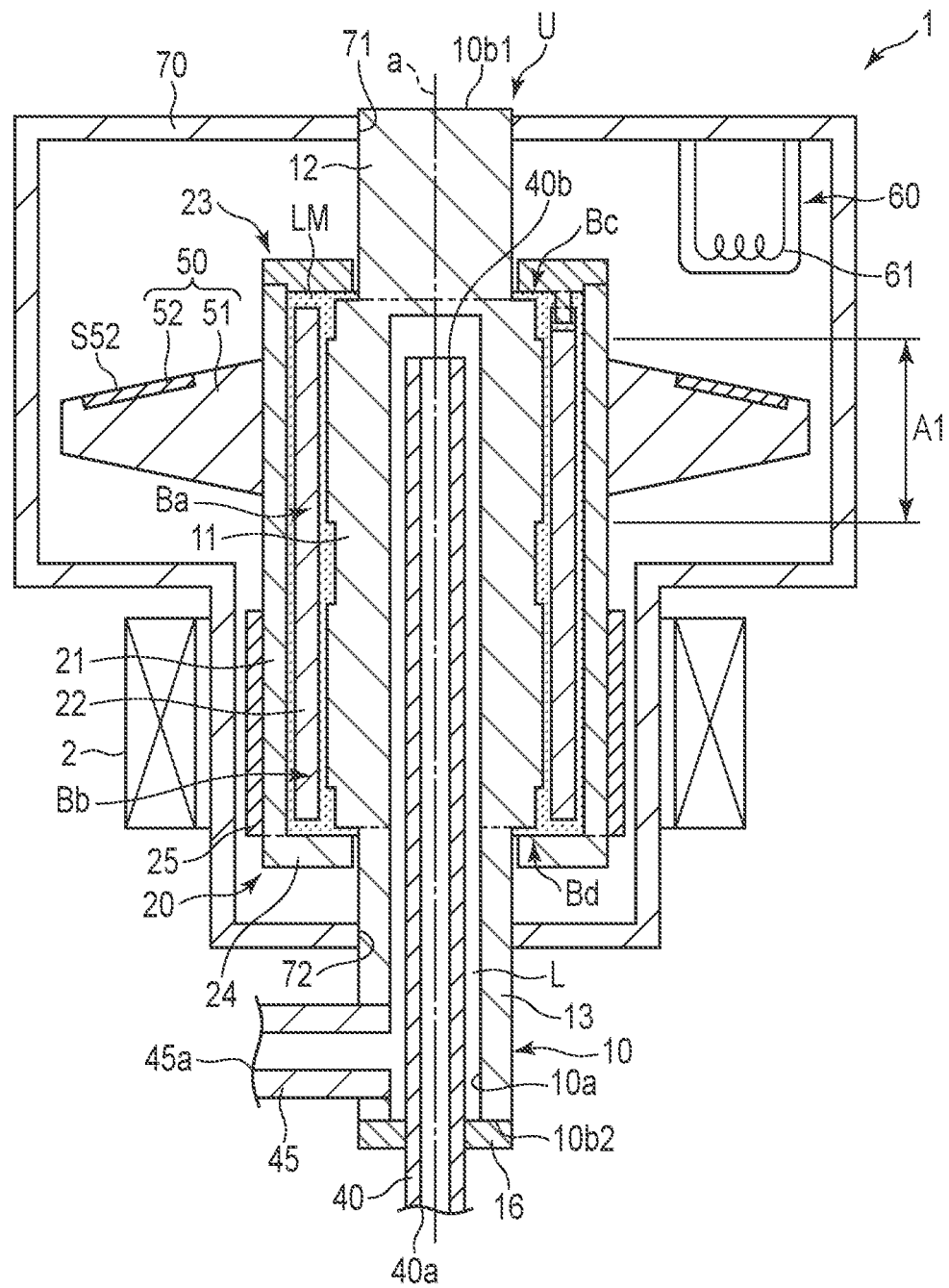
FIG. 5 is a cross-sectional view showing an X-ray tube assembly according to a first embodiment.
Figure 6:
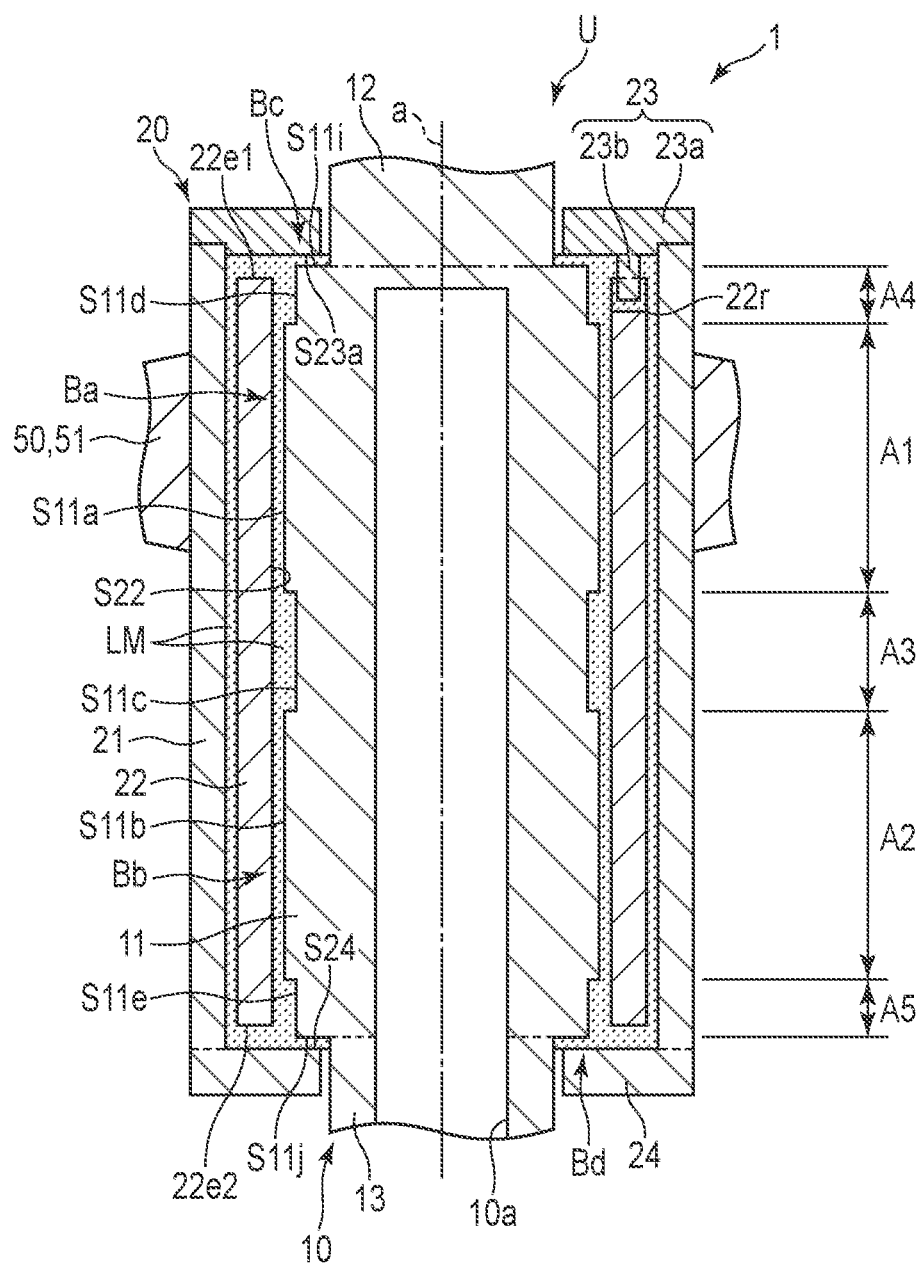
FIG. 6 is an enlarged cross-sectional view showing a part of the X-ray tube shown in FIG. 5.
Figure 7:
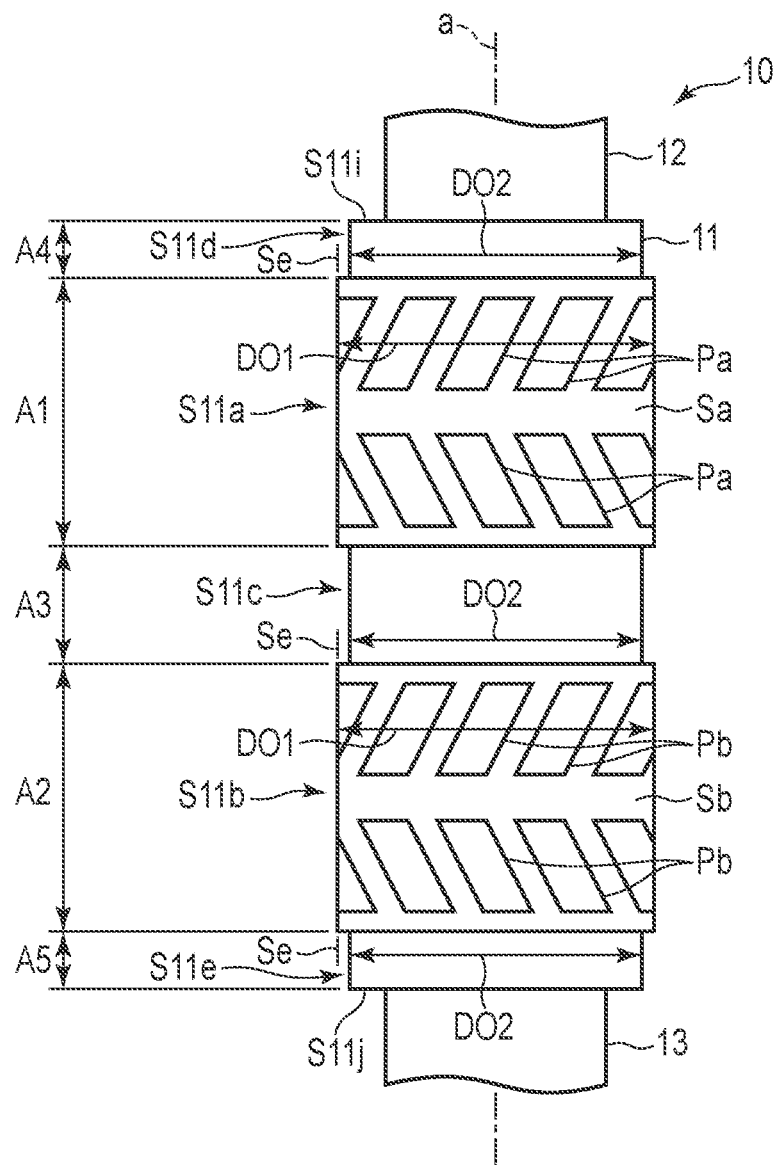
FIG. 7 is a side view showing a part of a stationary shaft shown in FIG. 5.
Figure 8:
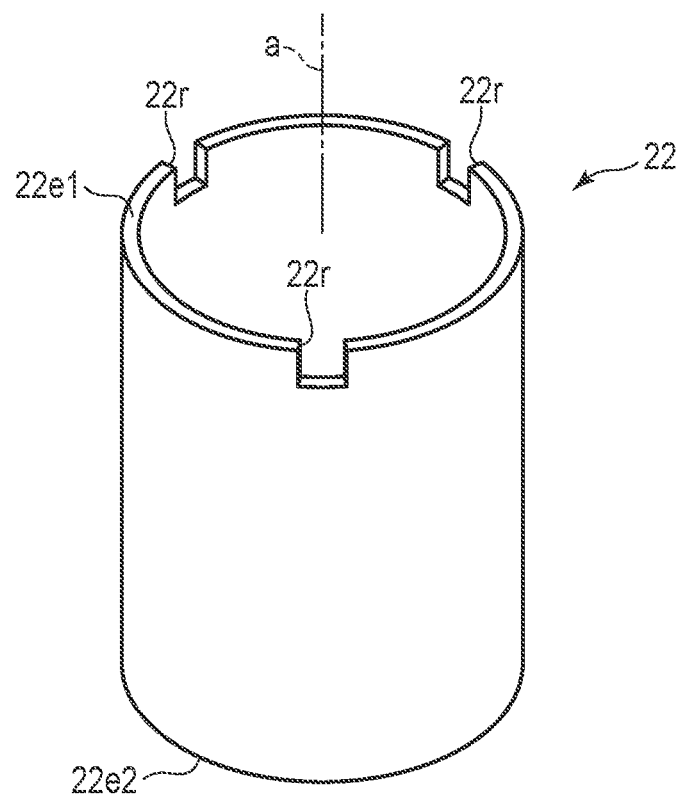
FIG. 8 is a perspective view showing a second cylinder shown in FIG. 5.
Figure 9:
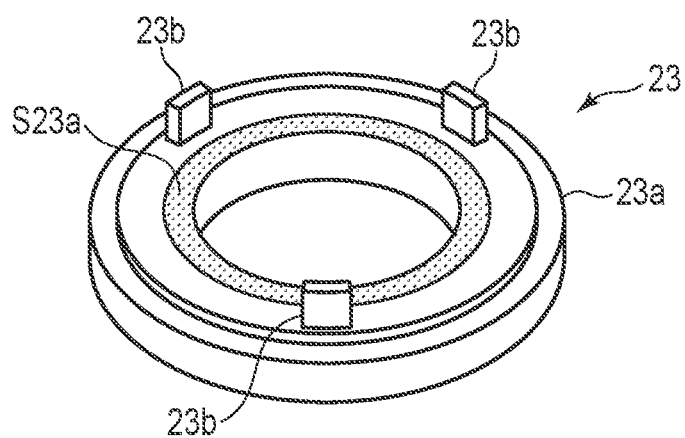
FIG. 9 is a perspective view showing a first restriction member shown in FIG. 5.

Next, an X-ray tube assembly according to a first embodiment will be described. FIG. 5 is a cross-sectional view of the X-ray tube assembly according to the first embodiment. FIG. 6 is an enlarged cross-sectional view showing a part of an X-ray tube 1 shown in FIG. 5. FIG. 7 is a side view showing a part of a stationary shaft 10 shown in FIG. 5. FIG. 8 is a perspective view of a second cylinder 22 shown in FIG. 5. FIG. 9 is a perspective view of a first restriction member 23 shown in FIG. 5.

As shown in FIG. 5, the X-ray tube assembly comprises a rotating anode type X-ray tube 1, a stator coil 2 as a coil for generating a magnetic field, and the like. The X-ray tube 1 comprises a sliding bearing unit U, an anode target 50, a cathode 60, and an envelope 70. The sliding bearing unit U comprises a stationary shaft 10, a rotor (rotating shaft) 20, and a liquid metal LM, and uses sliding bearings.

As shown in FIG. 5 to FIG. 7, the stationary shaft 10 is formed in a columnar shape, extends along a rotation axis a, and has radial bearing surfaces S11*a* and S11*b* formed on the outer peripheral surface and a heat transfer portion 10*a*. The stationary shaft 10 comprises a large diameter portion 11, a first small diameter portion 12, and a second small diameter portion 13. The large diameter portion 11, the first small diameter portion 12, and the second small diameter portion 13 are coaxially integrally formed. The stationary shaft 10 is made of a metal such as a Fe (iron) alloy or a Mo (molybdenum) alloy.

The large diameter portion 11 of the stationary shaft 10 is located in an area A1, an area A2, an area A3, an area A4, and an area A5 arranged along the rotation axis a. Note that the area A1 is an area surrounded by the anode target 50. The area A2 is located at a distance from the area A1 in the direction along the rotation axis a. The area A3 is located between the area A1 and the area A2, and is adjacent to each of the area A1 and the area A2. The area A4 is located beyond the area A1 from the area A3 and is adjacent to the area A1. The area A5 is located beyond the area A2 from the area A3 and is adjacent to the area A2.

The large diameter portion 11 is formed in a columnar shape and has the radial bearing surface S11*a*, the radial bearing surface S11*b*, a concave surface S11*c*, a concave surface S11*d*, and a concave surface S11*e* located on the outer peripheral surface, respectively. Furthermore, the large diameter portion 11 has a thrust bearing surface S11*i* at one end and a thrust bearing surface S11*j* at another end. The radial bearing surface S11*a* and the radial bearing surface S11*b* are each formed on the outer peripheral surface of the large diameter portion 11 over the entire circumference. In the first embodiment, the concave surface S11*c*, the concave surface S11*d*, and the concave surface S11*e* are each formed on the outer peripheral surface of the large diameter portion 11 over the entire circumference. However, the concave surface S11*c*, the concave surface S11*d*, and the concave surface S11*e* may be formed intermittently in the circumferential direction, respectively.

The radial bearing surface S11*a* is formed on the large diameter portion 11 in the area A1. The radial bearing surface S11*b* is formed on the large diameter portion 11 in the area A2. The radial bearing surface S11*a* and the radial bearing surface S11*b* are located at intervals in the direction along the rotation axis a.

The radial bearing surface S11*a* has a plane surface Sa and a plurality of patterned portions Pa. The plane surface Sa has a smooth outer peripheral surface. The plurality of patterned portions Pa are formed by recessing the plane surface Sa, and are arranged on the outer peripheral surface of the large diameter portion 11 in the area A1 over the entire circumference. Each patterned portion Pa is arranged so as to extend diagonally with respect to the circumferential direction.

The plurality of patterned portions Pa are formed at intervals in the direction along the rotation axis a. However, the plurality of patterned portions Pa may be connected in the direction along the rotation axis a.

The radial bearing surface S11b has a plane surface Sb and a plurality of patterned portions Pb. The plane surface Sb has a smooth outer peripheral surface. The plurality of patterned portions Pb are formed by recessing the plane surface Sb, and are arranged on the outer peripheral surface of the large diameter portion 11 in the area A2 over the entire circumference. The patterned portions Pb are arranged so as to extend diagonally with respect to the circumferential direction.

The plurality of patterned portions Pb are formed at intervals in the direction along the rotation axis a. However, the plurality of patterned portions Pb may be connected in the direction along the rotation axis a.

Each patterned portion Pa and each patterned portion Pb are formed of grooves having a depth of several tens of μm. The plurality of patterned portions Pa and the plurality of patterned portions Pb each form a herringbone pattern. Therefore, the radial bearing surfaces S11a and S11b are uneven surfaces, respectively, and can scrape the liquid metal LM therein, allowing dynamic pressure due to the liquid metal LM to be easily generated.

The concave surface S11c is formed on the large diameter portion 11 in the area A3. The concave surface S11d is formed on the large diameter portion 11 in the area A4. The concave surface S11e is formed on the large diameter portion 11 in the area A5. The concave surface S11c, the concave surface S11d, and the concave surface S11e are located at intervals in the direction along the rotation axis a and are separated from the radial bearing surface S11a and the radial bearing surface S11b.

The concave surface S11c is arranged side by side with each of the radial bearing surface S11a and the radial bearing surface S11b in the direction along the rotation axis a. The concave surface S11d is arranged side by side with the radial bearing surface S11a in the direction along the rotation axis a. The concave surface S11e is arranged side by side with the radial bearing surface S11b in the direction along the rotation axis a. Each of the concave surfaces S11c, S11d, and S11e is a smooth outer peripheral surface and a plane surface.

The concave surface S11c, the concave surface S11d, and the concave surface S11e are formed to be recessed as compared with the radial bearing surface S11a and the radial bearing surface S11b. In other words, the concave surfaces S11c, S11d, and S11e are located on the rotation axis a side of virtual extension surfaces Se of the radial bearing surfaces S11a and S11b. In other words, in the stationary shaft 10, an outer diameter DO2 of the section where the concave surfaces S11c, S11d, S11e are formed is smaller than a minimum outer diameter DO1 of the outer diameters of the sections where the radial bearing surfaces S11a and S11b are formed.

In a direction perpendicular to the rotation axis a, the gap between the concave surface (concave surfaces S11c, S11d, and S11e) and the second cylinder 22 is larger than the gap between the radial bearing surface S11a (plane surface Sa) and the second cylinder 22, and is larger than the gap between the radial bearing surface S11b (plane surface Sb) and the second cylinder 22.

In the present first embodiment, the gap between the radial bearing surface S11a (plane surface Sa) and the second cylinder 22 and the gap between the radial bearing surface S11b (plane surface Sb) and the second cylinder 22 in a direction perpendicular to the rotation axis a are 10 to 40 μm, respectively. Note that the gaps may be less than 10 μm. Furthermore, the gap between the concave surface (concave surfaces S11c, S11d, and S11e) and the second cylinder 22 in a direction perpendicular to the rotation axis a is 0.1 to 3 mm.

The space between the concave surface S11c and the second cylinder 22, the space between the concave surface S11d and the second cylinder 22, and the space between the concave surface S11e and the second cylinder 22 can be made to function as a reservoir for accommodating the liquid metal LM. Since the liquid metal LM can be supplied to each of the radial bearing surfaces S11a and S11b from both sides, the depletion of the liquid metal LM in the bearing gap can be suppressed.

It is possible to suppress contact between the radial bearing surfaces that occurs in a case where the liquid metal LM becomes diluted in the bearing gap or the liquid metal LM does not exist. Furthermore, since it is possible to suppress the generation of a foreign matter itself caused by scraping at least one of the bearing surfaces, it is possible to suppress the mixing of the foreign matter into the liquid metal LM.

The first small diameter portion 12 is formed in a columnar shape having an outer diameter smaller than the large diameter portion 11, and is located on one end side of the large diameter portion 11. The first small diameter portion 12 is located on the rotation axis a side with respect to the thrust bearing surface S11i.

The second small diameter portion 13 is formed in a columnar shape having an outer diameter smaller than the large diameter portion 11, and is located on the other end side of the large diameter portion 11. The second small diameter portion 13 is located on the rotation axis a side with respect to the thrust bearing surface S11j.

The stationary shaft 10 includes a first bottom surface 10b1, a second bottom surface 10b2, and the heat transfer portion 10a. The second bottom surface 10b2 is located on the opposite side of the first bottom surface 10b1 in the direction along the rotation axis a. In the present first embodiment, the first bottom surface 10b1 is located on the first small diameter portion 12, and the second bottom surface 10b2 is located on the second small diameter portion 13.

The heat transfer portion 10a extends along the rotation axis a and is open to at least one of the first bottom surface 10b1 and the second bottom surface 10b2. In the present first embodiment, the heat transfer portion 10a is a heat transfer hole and is open to the second bottom surface 10b2. The heat transfer portion 10a forms a flow path for a cooling fluid. The heat transfer portion 10a transfers heat to the cooling fluid flowing inside by forced convection. In the present first embodiment, the cooling fluid is a coolant L. The cooling rate of the anode target 50 of the X-ray tube 1 can be improved by water cooling or oil cooling. However, the cooling fluid may be air, and the cooling rate of the anode target 50 may also be improved by air cooling.

It is desirable that the heat transfer portion 10a is located at least in the area A1. As a result, it is possible to cool a portion of the stationary shaft 10 where the heat of the anode target 50 is easily transferred.

As shown in FIG. 5 and FIG. 6, the rotor 20 is configured to be rotatable around the stationary shaft 10. The rotor 20 comprises a first cylinder 21, the second cylinder 22, the first restriction member 23, a second restriction member 24, and a tubular portion 25. The first cylinder 21, the second cylinder 22, the first restriction member 23, and the second restriction member 24 are each made of a metal such as an Fe alloy or a Mo alloy. The tubular portion 25 is made of a metal such as copper (Cu) or a copper alloy. In the rotor 20, the first cylinder 21 is an outer cylinder located on the outer side, and the second cylinder 22 is an inner cylinder located relatively on the inner side.

The first cylinder 21 extends along the rotation axis a, is formed in a tubular shape, and is located so as to surround the stationary shaft 10 (large diameter portion 11). In the present first embodiment, the first cylinder 21 has a uniform inner diameter and outer diameter over the entire length.

As shown in FIG. 5, FIG. 6 and FIG. 8, the second cylinder 22 extends along the rotation axis a and is formed in a tubular shape. The second cylinder 22 is located between the stationary shaft 10 and the first cylinder 21. In the present first embodiment, the second cylinder 22 has a uniform inner diameter and outer diameter over the entire length. The inner diameter of the second cylinder 22 is larger than the stationary shaft 10 (large diameter portion 11), and the outer diameter of the second cylinder 22 is smaller than the inner diameter of the first cylinder 21.

The second cylinder 22 includes a radial bearing surface S22 on the inner peripheral surface. The radial bearing surface S22 is located at least in the area A1 and the area A2. In the present first embodiment, the radial bearing surface S22 is a smooth inner peripheral surface and is a plane surface. Due to the gap between the second cylinder 22 and the stationary shaft 10 and the gap between the second cylinder 22 and the first cylinder 21, the second cylinder 22 can move to an eccentric position with respect to each of the stationary shaft 10 and the first cylinder 21. The operation of the second cylinder 22 is restricted so that the second cylinder 22 does not rotate relative to the first cylinder 21. Therefore, the rotation speed of the second cylinder 22 is the same as the rotation speed of the first cylinder 21.

In the direction along the rotation axis a, the length of the second cylinder 22 is shorter than the length of the large diameter portion 11. The length of the second cylinder 22 is adjusted so as not to impair the functions of the radial sliding bearing and the thrust sliding bearing described later.

The second cylinder 22 includes a first end surface 22e1, a second end surface 22e2, and one or more recesses 22r. The first end surface 22e1 is located at the end of the second cylinder 22 in the direction along the rotation axis a. The second end surface 22e2 is located at the end of the second cylinder 22 in the direction along the rotation axis a, and is on the opposite side of the first end surface 22e1. In the present embodiment, the second cylinder 22 has three recesses 22r. These recesses 22r are located at intervals from each other in the circumferential direction. Each recess 22r opens in the first end surface 22e1 and is recessed in the direction along the rotation axis a.

In the present first embodiment, the gap between the first cylinder 21 and the second cylinder 22 in a direction perpendicular to the rotation axis a is from 10 to 40 μm.

As shown in FIG. 5, FIG. 6 and FIG. 9, the first restriction member 23 has a first member 23a and one or more second members 23b. In the present embodiment, the first restriction member 23 has three second members 23b. The first member 23a has an annular shape and is fixed to the first cylinder 21. For example, as in the present first embodiment, in order to fix the relative position of the first member 23a with respect to the first cylinder 21, an annular step portion may be formed on the outer peripheral side of the first member 23a. The step portion of the first member 23a can be fitted to the first cylinder 21.

By holding the first member 23a in a state of being pressed against the first cylinder 21 in the direction along the rotation axis a, the first member 23a can be fixed to the first cylinder 21. Alternatively, the first member 23a may be fixed to the first cylinder 21 by welding or brazing, or the first member 23a may be detachably fixed to the first cylinder 21 by using a screw.

The first member 23a faces the first end surface 22e1 of the second cylinder 22. Thereby, the first member 23a can restrict the movement of the second cylinder 22 in the direction along the rotation axis a. The first member 23a includes a thrust bearing surface S23a facing the thrust bearing surface S11i of the stationary shaft 10 in the direction along the rotation axis a. The thrust bearing surface S23a is located on the inner peripheral side of the first member 23a and has an annular shape. Note that, in FIG. 9, the thrust bearing surface S23a is denoted by a dot pattern.

Each second member 23b protrudes from the first member 23a in a direction along the rotation axis a. The second member 23b is provided in a one-to-one correspondence with the recess 22r of the second cylinder 22. Each second member 23b is fitted in the recess 22r of the second cylinder 22. In the present first embodiment, a sufficient gap for fitting is secured between the second member 23b and the recess 22r. Therefore, the second member 23b can be fitted into the recess 22r without using a tightening fit. Furthermore, the gap between the second member 23b and the recess 22r can be used for a circulation path of the liquid metal LM.

The second member 23b is configured to restrict an operation of the second cylinder 22 together with the recess 22r of the second cylinder 22. The second cylinder 22 is restricted so as not to rotate with respect to the first cylinder 21.

The gap (clearance) between the first restriction member 23 (first member 23a) and the stationary shaft 10 (first small diameter portion 12) is set to a value that can maintain the rotation of the rotor 20 and suppress the leakage of the liquid metal LM. From the above, the gap is slight, and the first member 23a functions as a labyrinth seal ring.

As shown in FIG. 5 and FIG. 6, the second restriction member 24 has an annular shape and is fixed to the first cylinder 21. In the present first embodiment, the second restriction member 24 is integrally molded with the same material as the first cylinder 21. The second restriction member 24 faces the second end surface 22e2 of the second cylinder 22. As a result, the second restriction member 24 can restrict the movement of the second cylinder 22 in the direction along the rotation axis a.

The second restriction member 24 includes a thrust bearing surface S24 facing the thrust bearing surface S11j of the stationary shaft 10 in the direction along the rotation axis a. The thrust bearing surface S24 is located on the inner peripheral side of the second restriction member 24 and has an annular shape.

Furthermore, the gap (clearance) between the second restriction member 24 and the stationary shaft 10 (second small diameter portion 13) is set to a value that can maintain the rotation of the rotor 20 and suppress the leakage of the liquid metal LM. From the above, the gap is small, and the second restriction member 24 functions as a labyrinth seal ring.

The tubular portion 25 is joined to the outer peripheral surface of the first cylinder 21 and is fastened to the first cylinder 21. Note that, in FIG. 6, the tubular portion 25 is not shown.

When assembling to the sliding bearing unit U, the second cylinder 22 is inserted into an integral body of the first cylinder 21 and the second restriction member 24, and then the stationary shaft 10 is fitted to the second cylinder 22.

Subsequently, the first restriction member 23 is fixed to the first cylinder 21 to be covered by the first restriction member 23.

In the present embodiment, the second restriction member 24 is formed integrally with the first cylinder 21, and the first restriction member 23 is a lid that is physically independent of the first cylinder 21.

However, the first restriction member 23 may be formed integrally with the first cylinder 21, and the second restriction member 24 may be a lid that is physically independent of the first cylinder 21.

Alternatively, the first restriction member 23 and the second restriction member 24 may each be a lid physically independent of the first cylinder 21.

The stationary shaft 10 and the rotor 20 are provided with a gap between them in all facing areas. The large diameter portion 11 is covered with the rotor 20. The first small diameter portion 12 and the second small diameter portion 13 protrude to the outside of the rotor 20. The stationary shaft 10 rotatably supports the rotor 20.

The liquid metal LM fills a plurality of gaps between the stationary shaft 10 (large diameter portion 11), the first cylinder 21, the second cylinder 22, the first restriction member 23, and the second restriction member 24. As the liquid metal LM, a material such as a GaIn (gallium-indium) alloy or a GaInSn (gallium-indium-tin) alloy can be used. An appropriate amount of the liquid metal LM is filled in the plurality of gaps. During the operation of the rotor 20, the liquid level of the liquid metal LM on the rotation axis a side is located on the rotation axis a side with respect to the radial bearing surfaces S11a and S11b. This makes it possible to suppress the depletion of the liquid metal LM in the bearing gap.

The liquid metal LM forms a dynamic pressure sliding bearing together with the bearing surface of the stationary shaft 10 and the bearing surface of the rotor 20.

The liquid metal LM forms a dynamic pressure radial sliding bearing Ba together with the radial bearing surface S11a and the radial bearing surface S22. The radial sliding bearing Ba is located in the area A1.

The liquid metal LM forms a dynamic pressure radial sliding bearing Bb together with the radial bearing surface S11b and the radial bearing surface S22. The radial sliding bearing Bb is located in the area A2.

The liquid metal LM forms a dynamic pressure thrust sliding bearing Bc together with the thrust bearing surface S11i and the thrust bearing surface S23a.

The liquid metal LM forms a dynamic pressure thrust sliding bearing Bd together with the thrust bearing surface S11j and the thrust bearing surface S24.

The gap between the first end surface 22e1 (recessed portion 22r) of the second cylinder 22 and the first restriction member 23 is connected to the gap between the stationary shaft 10 and the second cylinder 22 and the gap between the first cylinder 21 and the second cylinder 22 so as to configure a circulation path for the liquid metal LM. The gap between the second end surface 22e2 of the second cylinder 22 and the second restriction member 24 is connected to the gap between the stationary shaft 10 and the second cylinder 22 and the gap between the first cylinder 21 and the second cylinder 22 so as to configure a circulation path for the liquid metal LM.

From the above, the liquid metal LM can move through the plurality of gaps between the stationary shaft 10 (large diameter portion 11), the first cylinder 21, the second cylinder 22, the first restriction member 23, and the second restriction member 24.

The anode target 50 is formed in an annular shape and is provided coaxially with the stationary shaft 10, the first cylinder 21, and the second cylinder 22. The anode target 50 has the anode target main body 51 and the target layer 52 provided on a part of the outer surface of the anode target main body 51. The anode target main body 51 is formed in an annular shape. The anode target main body 51 surrounds the outer peripheral surface of the first cylinder 21 and is fixed to the first cylinder 21. In the present embodiment, the anode target main body 51 is fixed to the first cylinder 21.

The anode target main body 51 is formed of molybdenum, tungsten, or an alloy using these. The melting point of the metal forming the target layer 52 is the same as the melting point of the metal forming the anode target main body 51, or higher than the melting point of the metal forming the anode target main body 51. In the present first embodiment, the anode target main body 51 is made of a molybdenum alloy, and the target layer 52 is made of a tungsten alloy.

The anode target 50 is rotatable together with the rotor 20. When an electron collides with a target surface S52 of the target layer 52, a focal point is formed on the target surface S52. As a result, the anode target 50 emits X-rays from the focal point.

Here, the materials of the stationary shaft 10, the first cylinder 21, the second cylinder 22, and the anode target main body 51 will be described.

The degree of freedom in selecting the materials for the first cylinder 21 and the second cylinder 22 is high. Therefore, the second cylinder 22 may be formed of the same material as the first cylinder 21, or may be formed of a material different from that of the first cylinder 21.

The second cylinder 22 may be made of the same material as the stationary shaft 10. The coefficient of thermal expansion of the second cylinder 22 and the coefficient of thermal expansion of the stationary shaft 10 can be matched. For example, fluctuations in the radial bearing gap can be suppressed.

The first cylinder 21 may be made of the same material as the stationary shaft 10. The coefficient of thermal expansion of the first cylinder 21 and the coefficient of thermal expansion of the stationary shaft 10 can be matched. For example, fluctuations in the thrust bearing gap can be suppressed.

Note that the stationary shaft 10 may be made of a material different from that of the first cylinder 21 or may be made of a material different from that of the second cylinder 22. For example, the stationary shaft 10 may be formed of a metal softer than the first cylinder 21, or the stationary shaft 10 may be formed of a metal softer than the second cylinder 22. Since the stationary shaft 10 can be easily machined, the productivity of the stationary shaft 10 can be improved.

In a case where the anode target main body 51 is located on the outer peripheral surface of the first cylinder 21 at a distance, the first cylinder 21 may be formed of the same material as the anode target main body 51 or may be formed of a material different from the anode target main body 51.

In a case where the anode target main body 51 is connected to the outer peripheral surface of the first cylinder 21, and the anode target main body 51 is fastened to the outer peripheral surface of the first cylinder 21, the first cylinder 21 is made of the same material as the anode target main body 51. The coefficient of thermal expansion of the anode target main body 51 can be matched with the coefficient of thermal expansion of the first cylinder 21. For example, it is possible to suppress a situation where the anode target main body 51 is detached from the first cylinder 21 or at least one of the first cylinder 21 and the anode target main body 51 is damaged.

As shown in FIG. 5, the cathode 60 is arranged to face the target layer 52 at a distance from the target layer 52 of the anode target 50. The cathode 60 is attached to the inner wall of the envelope 70. The cathode 60 has a filament 61 as an electron emission source that emits electrons to irradiate the target layer 52.

The envelope 70 is formed in a cylindrical shape. The envelope 70 is made of glass, ceramic and metal. In the envelope 70, the outer diameter of a part facing the anode target 50 is larger than the outer diameter of a part facing the tubular portion 25. The envelope 70 has openings 71 and 72. The envelope 70 is hermetically sealed and houses the sliding bearing unit U, the anode target 50, and the cathode 60. The inside of the envelope 70 is maintained in a vacuum state (decompressed state).

The opening 71 is airtightly joined to one end (first small diameter portion 12) of the stationary shaft 10, and the opening 72 is airtightly joined to the other end (second small diameter portion 13) of the stationary shaft 10 so as to maintain the airtight state of the envelope 70. In the present embodiment, the X-ray tube 1 adopts a bearing structure supported at both ends. The envelope 70 fixes the first small diameter portion 12 and the second small diameter portion 13 of the stationary shaft 10. That is, the first small diameter portion 12 and the second small diameter portion 13 function as a double-sided support portion of the bearing.

The X-ray tube 1 comprises a tube portion 40 provided inside the stationary shaft 10. An annulus portion 16 is liquid-tightly joined to the second bottom surface 10b2 of the stationary shaft 10. The outer peripheral surface of the tube portion 40 is liquid-tightly joined to the opening of the annulus portion 16, and the tube portion 40 extends to the outside of the stationary shaft 10. The stationary shaft 10 forms a flow path of the coolant L together with the tube portion 40.

The tube portion 40 has an inlet 40a for taking in the coolant and a discharge port 40b for discharging the coolant L to the inside of the stationary shaft 10. The inlet 40a is located on the side extending outward from the second bottom surface 10b2 of the stationary shaft 10. Furthermore, the discharge port 40b is located with a gap on the bottom surface of the heat transfer portion 10a in the direction along the rotation axis a.

On the outside of the envelope 70, an opening is formed in the stationary shaft 10, and a tube portion 45 is liquid-tightly joined to the opening. The tube portion 45 has an outlet 45a for taking out the coolant L to the outside. From the above, the coolant L circulating inside the X-ray tube 1 is taken in from the inlet 40a, passes through the inside of the tube portion 40, is discharged from the discharge port 40b to the inside of the stationary shaft 10, passes between the tube portion 40 and the stationary shaft 10, and is taken out from the outlet 45a of the tube portion 45. Note that the coolant L may be circulated in the opposite direction. In this case, the tube portion 45 forms an inlet for the coolant L, and the tube portion 40 forms an outlet for the coolant L.

The stator coil 2 is provided so as to face the outer peripheral surface of the rotor 20, more specifically, the outer peripheral surface of the tubular portion 25, and surround the outside of the envelope 70. The shape of the stator coil 2 is annular. The stator coil 2 generates a magnetic field to be applied to the tubular portion 25 (rotor 20) and rotates the rotor 20 and the anode target 50.

The X-ray tube assembly comprising the X-ray tube 1 is formed in the manner described above.

In the operating state of the above X-ray tube assembly, the stator coil 2 generates a magnetic field to be applied to the rotor 20 (particularly the tubular portion 25) to rotate the second cylinder 22. As a result, the first cylinder 21 and the anode target 50 also rotate together. Furthermore, a current is applied to the cathode 60 to apply a negative voltage, and a relatively positive voltage is applied to the anode target 50.

This creates a potential difference between the cathode 60 and the anode target 50. The filament 61 emits electrons. The electrons are accelerated and collide with the target surface S52. As a result, a focal point is formed on the target surface S52, and the focal point emits X-rays when colliding with an electron. The electrons (thermoelectrons) that collide with the anode target 50 are converted into X-rays, and the rest are converted into heat energy. Note that the electron emission source of the cathode 60 is not limited to the filament, and may be, for example, a flat emitter. Furthermore, the X-ray tube 1 may be a cold cathode X-ray tube instead of a hot cathode X-ray tube.

Figure 10:
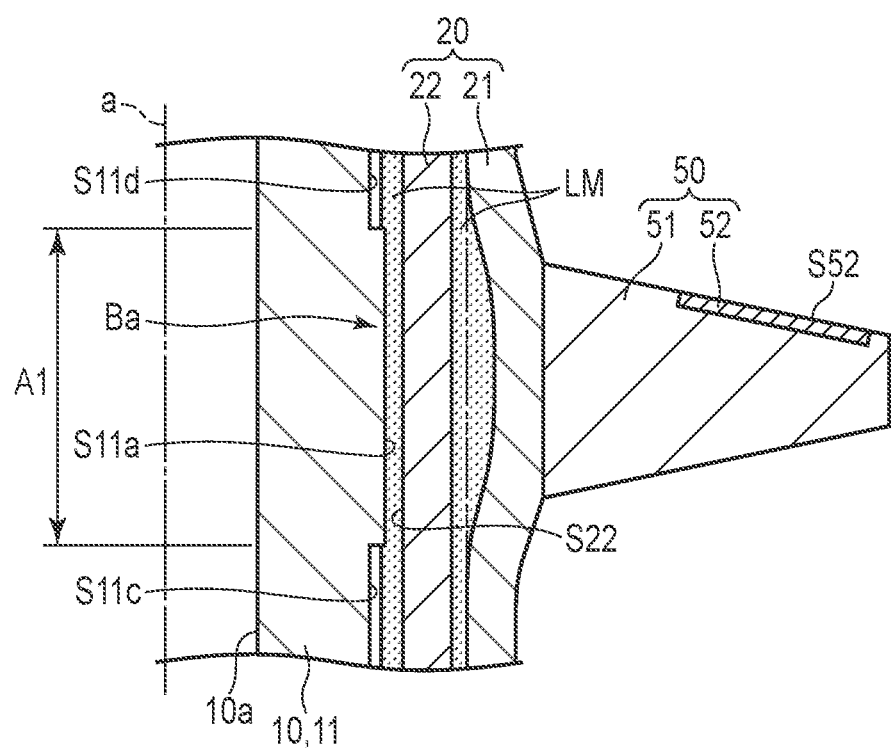
FIG. 10 is an enlarged cross-sectional view showing a part of an X-ray tube of the first embodiment above, showing a state until which heat is input to an anode target and the anode target is cooled.

FIG. 10 is an enlarged cross-sectional view showing a part of the X-ray tube 1 according to the first embodiment, and shows a state until which heat is input to the anode target 50 and the anode target 50 is cooled.

As shown in FIG. 10, when heat is generated in the anode target 50, the anode target 50 thermally expands. Then, stress due to the thermal expansion propagates to a portion integral with the anode target 50 or firmly coupled to the anode target 50, and causes thermal deformation to occur. In the present first embodiment, thermal deformation is likely to occur in the portion of the first cylinder 21 located in the area A1. For example, the portion of the first cylinder 21 located in the area A1 can be expanded outward in the radial direction by a maximum of 100 μm.

However, in the present first embodiment, the second cylinder 22 is not physically fixed to the first cylinder 21. The second cylinder 22 has a gap therebetween the first cylinder 21. Since the second cylinder 22 is not firmly coupled to the first cylinder 21, the stress due to the deformation of the first cylinder 21 is difficult to propagate to the second cylinder 22. Deformation of the second cylinder 22 due to thermal expansion of the anode target 50 can be suppressed, and deterioration of bearing performance can be suppressed.

Furthermore, since the volume between the first cylinder 21 and the second cylinder 22 increases, the liquid metal LM gathers on the first cylinder 21 side due to the centrifugal force, and a vacuum space is generated on the large diameter portion 11 side. However, since the concave surfaces S11c, S11d, and S11e form a reservoir space of the liquid metal LM in advance, the liquid metal LM can be supplied to the gap between the first cylinder 21 and the second cylinder 22 and the bearing gap. From the above, it is possible to suppress the deterioration of bearing performance. Furthermore, heat transfer from the anode target 50 to the large diameter portion 11 side will not be inhibited.

Note that, in the case where the second member 23b is fitted into the recess 22r, unlike the present first embodiment, the second member 23b may be fitted into the recess 22r by using a tightening fit. Also in this case, the deformation of the second cylinder 22 due to the thermal expansion of the anode target 50 can be suppressed. This is because the end portion of the first cylinder 21 is not easily deformed even if the anode target 50 is thermally expanded, and the second cylinder 22 is indirectly fixed to the end portion of the first cylinder 21 where it is not easily deformed.

As described above, the relative position of the second cylinder 22 with respect to the first cylinder 21 may be fixed by the tightening fit. In that case, the second cylinder 22 can be prevented from moving to a position eccentric with respect to the first cylinder 21. Note that the method of fixing the relative position of the second cylinder 22 with respect to the first cylinder 21 is not limited to the tightening fit, and may be performed by brazing, welding, or using screws.

In the present embodiment, the end portion of the second cylinder 22 on the first end surface 22e1 side is indirectly fixed to the first cylinder 21 via the first restriction member 23.

However, in order to fix the relative position of the second cylinder 22 with respect to the first cylinder 21, it is not necessary to fix the end portion of the second cylinder 22 on the first end surface 22e1 side. The end portion of the second cylinder 22 on the second end surface 22e2 side may be indirectly fixed to the first cylinder 21 via the second restriction member 24. Since the heat transfer path from the anode target 50 to the second end surface 22e2 is longer than to the first end surface 22e1, the deformation of the second cylinder 22 can be further suppressed.

Alternatively, the end portion of the second cylinder 22 on the first end surface 22e1 side may be indirectly fixed to the first cylinder 21 via the first restriction member 23, and the end portion of the second cylinder 22 on the second end surface 22e2 side may be indirectly fixed to the first cylinder 21 via the second restriction member 24.

According to the X-ray tube assembly according to the first embodiment configured as described above, the X-ray tube assembly comprises the rotating anode type X-ray tube 1. The X-ray tube 1 comprises the sliding bearing unit U, the anode target 50, the cathode 60, and the envelope 70. The sliding bearing unit U comprises the stationary shaft 10 extending along the rotation axis a and including radial bearing surfaces S11a and S11b on the outer peripheral surface, the rotor 20 rotatable around the stationary shaft 10, and the liquid metal LM.

The rotor 20 has the first cylinder 21 and the second cylinder 22. The first cylinder 21 extends along the rotation axis a and is formed in a tubular shape, and is located surrounding the stationary shaft 10. The second cylinder 22 extends along the rotation axis a and is formed in a tubular shape, is located between the stationary shaft 10 and the first cylinder 21, includes the radial bearing surface S22 on the inner peripheral surface, and has the operation restricted so as not to rotate relative to the first cylinder 21. The second cylinder 22 may be movable to a position eccentric with respect to each of the stationary shaft 10 and the first cylinder 21.

The liquid metal LM is filled in a plurality of gaps between the stationary shaft 10, the first cylinder 21, and the second cylinder 22, forms the dynamic pressure radial sliding bearing Ba together with the radial bearing surface S11a and the radial bearing surface S22, and forms the dynamic pressure radial sliding bearing Bb together with the radial bearing surface S11b and the radial bearing surface S22. The anode target 50 surrounds the outer peripheral surface of the first cylinder 21 and is fixed to the first cylinder 21.

The rotor 20 has a double cylindrical structure. The first cylinder 21 that is firmly coupled to the anode target 50 or is formed integrally with the anode target 50 and the second cylinder 22 that forms the radial sliding bearings Ba and Bb are physically independent. The second cylinder 22 is less susceptible to the adverse effects of thermal expansion of the anode target 50.

According to the X-ray tube assembly according to the first embodiment configured as described above, the sliding bearing unit U capable of obtaining good bearing operation and the X-ray tube 1 comprising the sliding bearing unit U can be obtained.

Second Embodiment

Figure 11:
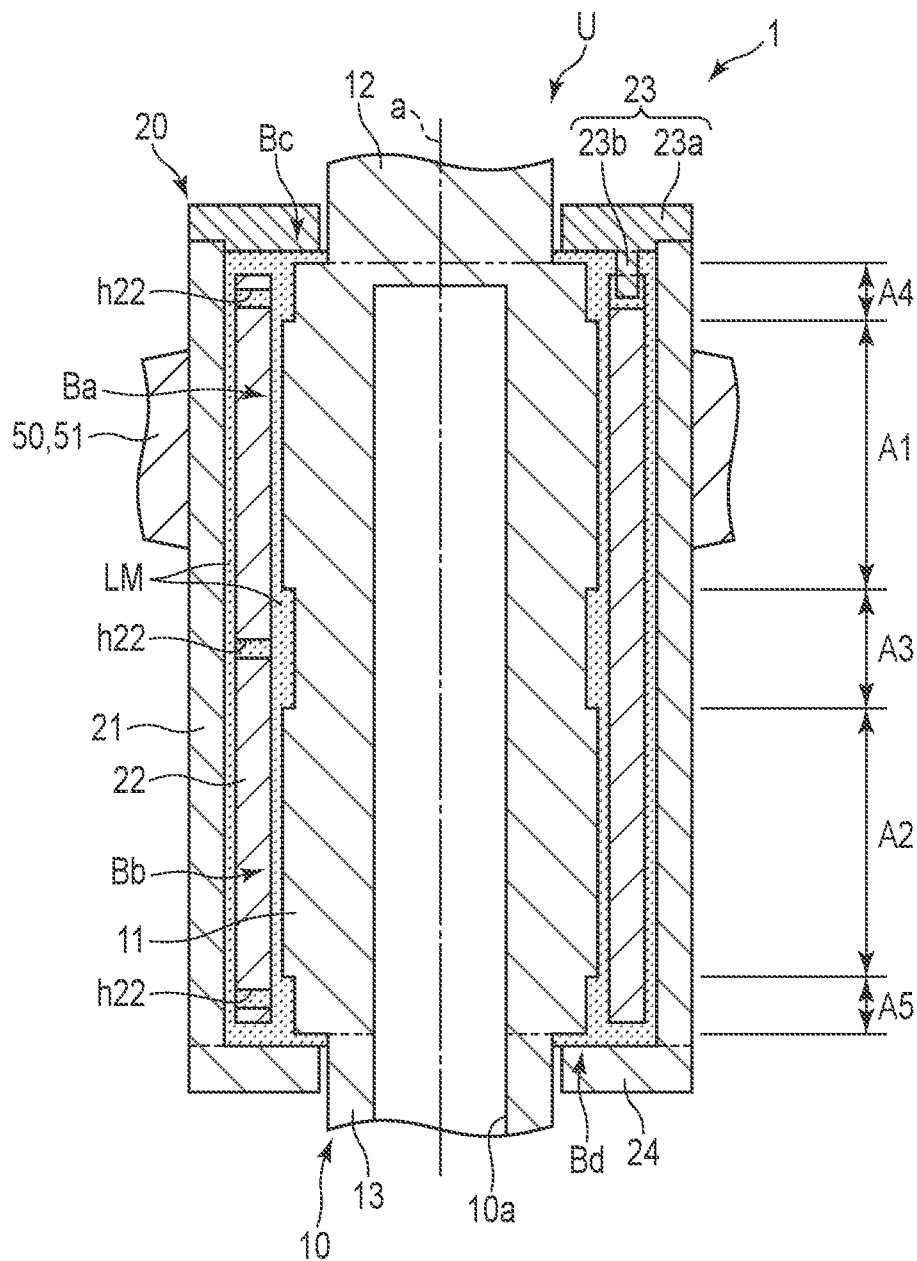
FIG. 11 is an enlarged cross-sectional view showing a part of an X-ray tube assembly according to a second embodiment.

Next, an X-ray tube assembly according to a second embodiment will be described. An X-ray tube 1 has the same configuration as that in the above first embodiment, except for the configurations described in the present second embodiment. FIG. 11 is an enlarged cross-sectional view showing a part of the X-ray tube assembly according to the present second embodiment.

As shown in FIG. 11, a second cylinder 22 further has a plurality of circulation holes h22. Each circulation hole h22 penetrates from the outer peripheral surface to the inner peripheral surface of the second cylinder 22. In the present second embodiment, each circulation hole h22 extends linearly in a direction perpendicular to a rotation axis a. Each circulation hole h22 is located outside the area A1 where a radial bearing surface S11a and a radial bearing surface S22 face each other, and the area A2 where a radial bearing surface S11b and the radial bearing surface S22 face each other.

The plurality of circulation holes h22 are located in areas A3, A4, and A5, and are provided at intervals in a direction along a rotation axis a. Although not shown, the plurality of circulation holes h22 may be provided in each of the areas A3, A4, and A5 at intervals in a circumferential direction.

The plurality of circulation holes h22 are connected to a gap between a stationary shaft 10 and the second cylinder 22 and a gap between a first cylinder 21 and the second cylinder 22, and form a circulation path for a liquid metal LM. Therefore, the liquid metal LM can be moved rapidly between both of the above gaps.

According to the second embodiment configured as described above, the same effect as that of the above first embodiment can be obtained. It is possible to obtain a sliding bearing unit U capable of obtaining good bearing operation and an X-ray tube 1 provided with this sliding bearing unit U.

Third Embodiment

Figure 12:
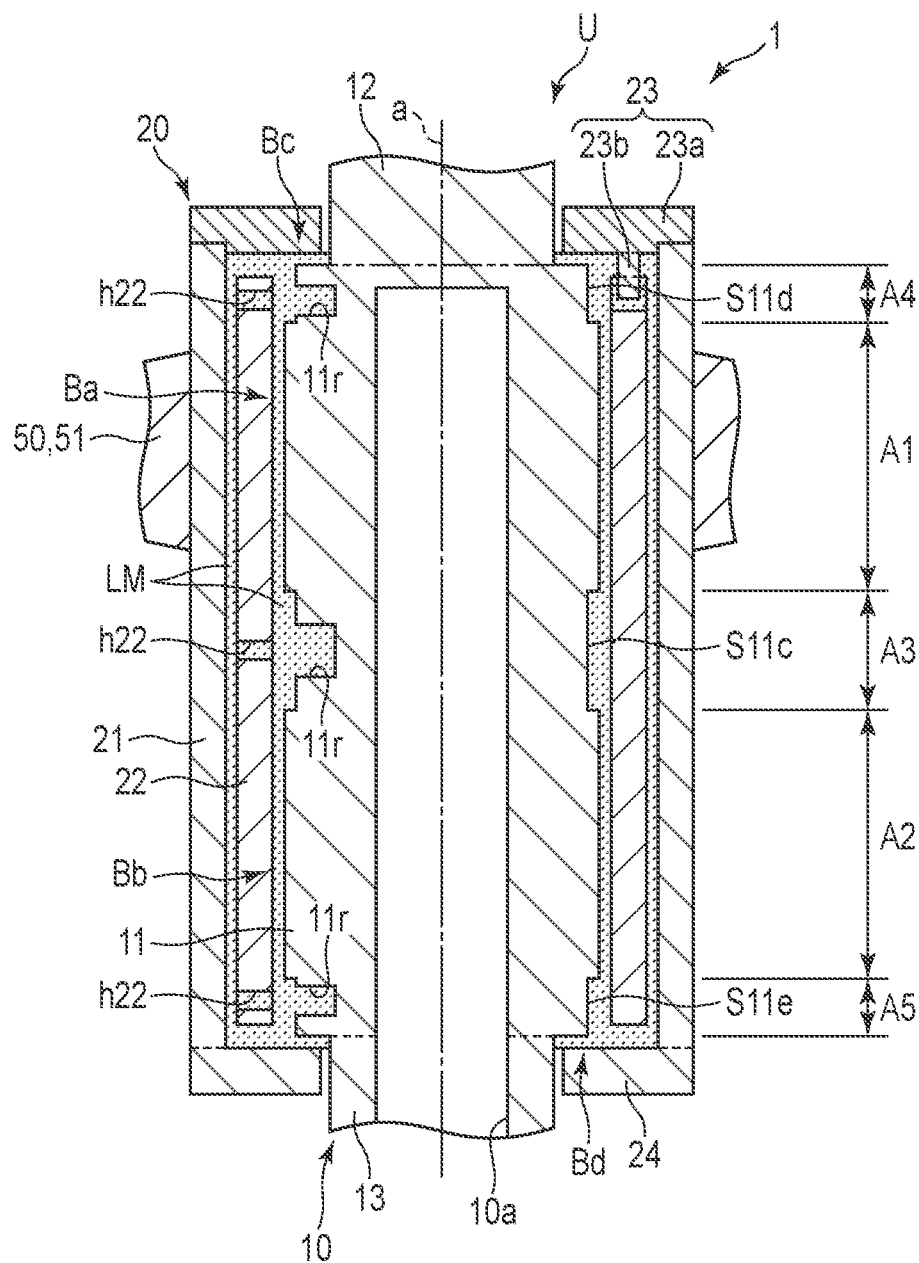
FIG. 12 is an enlarged cross-sectional view showing a part of an X-ray tube assembly according to a third embodiment.

Next, an X-ray tube assembly according to a third embodiment will be described. An X-ray tube 1 has the same configuration as that in the above second embodiment, except for the configurations described in the present third embodiment. FIG. 12 is an enlarged cross-sectional view showing a part of the X-ray tube assembly according to the present third embodiment.

As shown in FIG. 12, a stationary shaft 10 (large diameter portion 11) further has a plurality of groove portions 11r. Each groove portion 11r is opened in a concave surface S11c, a concave surface S11d, or a concave surface S11e, and is recessed toward a rotation axis a side. In the present third embodiment, each groove portion 11r is not formed over the entire circumference of the large diameter portion 11. The plurality of groove portions 11r are provided in an area facing a circulation hole h22, and are provided at intervals from each other in a direction along the rotation axis a and in a circumferential direction.

However, the groove portion 11r may also be formed over the entire circumference of the large diameter portion 11. Furthermore, the second cylinder 22 may also be formed without the circulation hole h22.

According to the third embodiment configured as described above, the same effect as that of the above second embodiment can be obtained. It is possible to obtain a sliding bearing unit U capable of obtaining good bearing operation and an X-ray tube 1 provided with this sliding bearing unit U.

Fourth Embodiment

Figure 13:
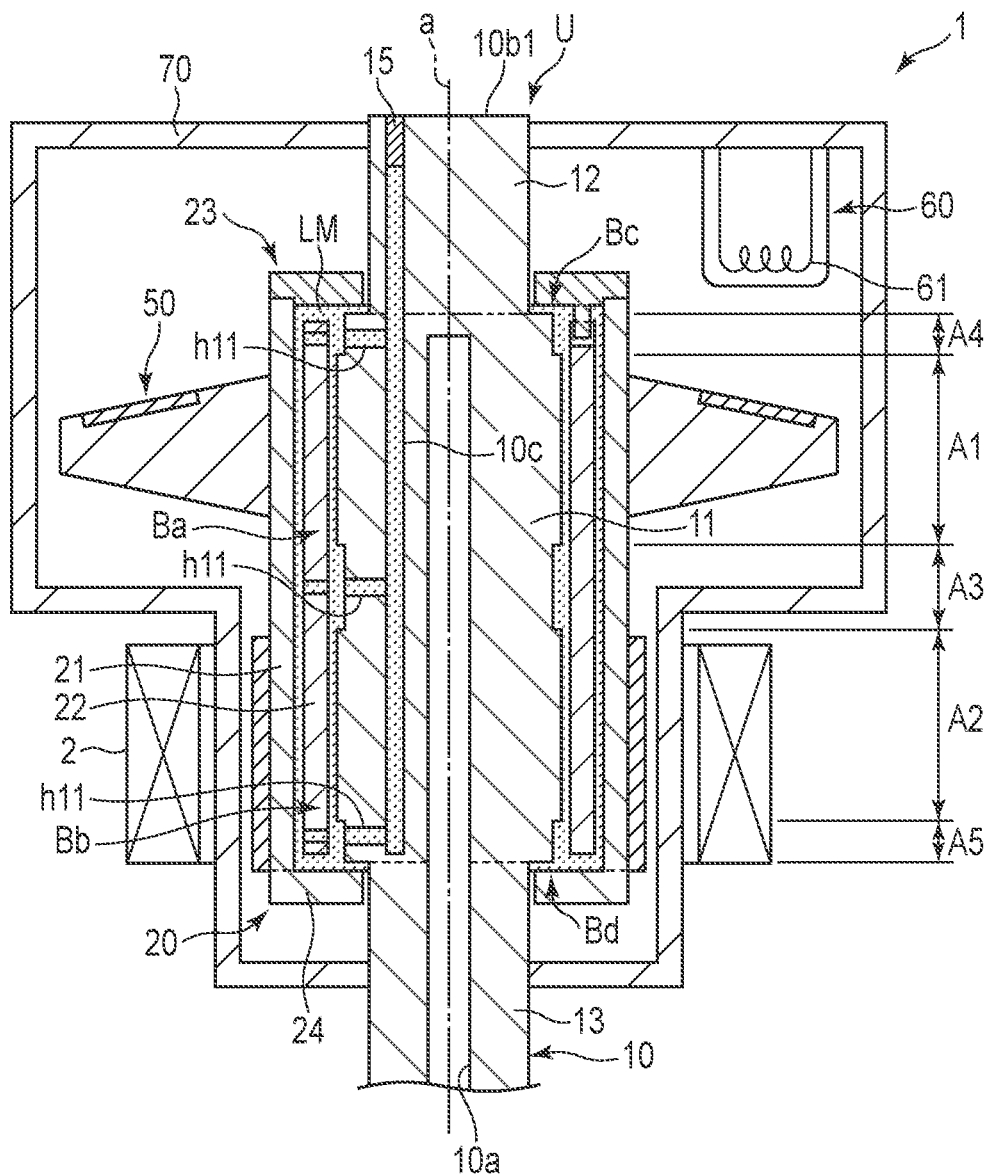
FIG. 13 is a cross-sectional view showing an X-ray tube assembly according to a fourth embodiment.
Figure 14:
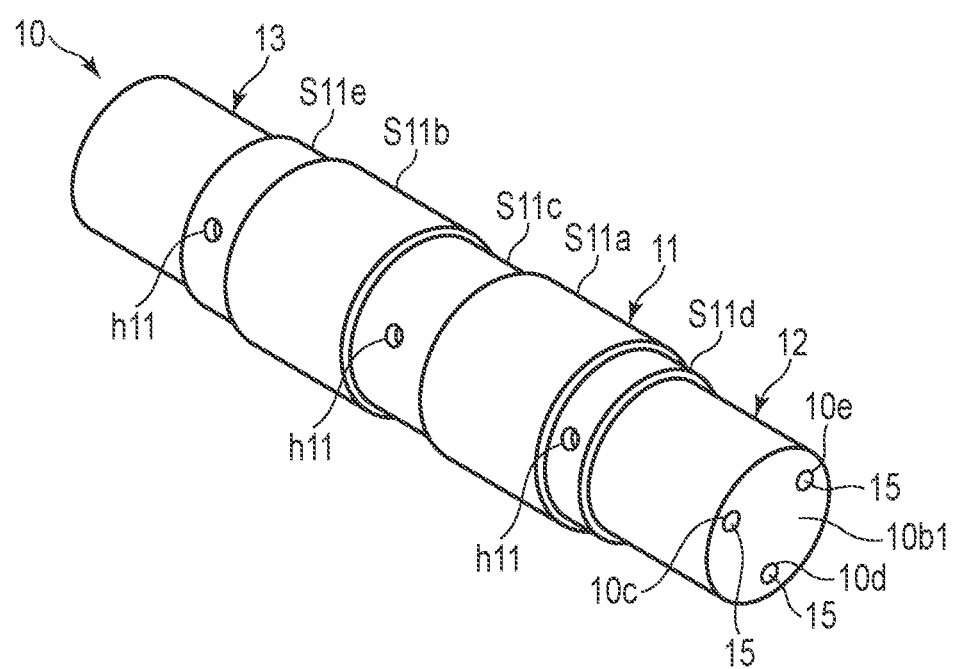
FIG. 14 is a perspective view showing a stationary shaft shown in FIG. 13.

Next, an X-ray tube assembly according to a fourth embodiment will be described. An X-ray tube 1 has the same configuration as that of the above second embodiment except for the configurations described in the present fourth embodiment. FIG. 13 is a cross-sectional view showing an X-ray tube assembly according to the present fourth embodiment. FIG. 14 is a perspective view showing a stationary shaft 10 shown in FIG. 13.

As shown in FIG. 13 and FIG. 14, the stationary shaft 10 has an accommodating portion and a circulation hole. The accommodating portion is provided inside the stationary shaft 10 and accommodates a liquid metal LM. The circulation hole penetrates from the accommodating portion to the outer peripheral surface of the stationary shaft 10, and is located to be separated from radial bearing surfaces S11a and S11b. In the present fourth embodiment, the stationary shaft 10 has an accommodating portion 10c, an accommodating portion 10d, an accommodating portion 10e, and a plurality of circulation holes h11.

The accommodating portions 10c, 10d, and 10e are each provided inside the stationary shaft 10 and are formed by through holes extending linearly in the direction along the rotation axis a. In the present fourth embodiment, the accommodating portions 10c, 10d, and 10e extend from at least the area A4 to the area A5. The accommodating portions 10c, 10d, and 10e are provided at intervals in the circumferential direction. Openings of the accommodating portions 10c, 10d, and 10e located on a first bottom surface 10b1 are sealed with a sealing material 15 to prevent the liquid metal LM from leaking to the outside of the X-ray tube 1.

The plurality of circulation holes h11 communicate with the accommodating portion 10c, the accommodating portion 10d, or the accommodating portion 10e, and extend linearly in a direction perpendicular to the rotation axis a. The plurality of circulation holes h11 are opened in any one of a concave surface S11c, a concave surface S11d, and a concave surface S11e. The circulation holes h11 can circulate the liquid metal LM between the accommodating portions 10c, 10d, and 10e and the gap between the stationary shaft 10 and the second cylinder 22.

The accommodating portions 10c, 10d, and 10e can function as a reservoir for accommodating the liquid metal LM. Therefore, the liquid metal LM temporarily accommodated in the accommodating portions 10c, 10d, and 10e can be supplied to the gap between the stationary shaft 10 and the second cylinder 22, and thus supplied to the gap between a first cylinder 21 and the second cylinder 22.

In the present fourth embodiment, the circulation holes h11 are provided at intervals in the direction along the rotation axis a and in the circumferential direction. The circulation hole h11 is located on the same straight line as the corresponding circulation hole h22. However, the circulation hole h11 does not have to be located on the same straight line as the circulation hole h22. Furthermore, the plurality of circulation holes h11 do not have to be provided in all of the areas A3, A4, and A5. For example, the plurality of circulation holes h11 may be provided only in the area A3 and may be opened only in the concave surface S11c.

Note that the circulation holes h11 may be located on at least one of the radial bearing surfaces S11a and S11b.

According to the fourth embodiment configured as described above, the same effect as that of the above second embodiment can be obtained. Furthermore, the depletion of the liquid metal LM in the bearing gap can be further suppressed. It is possible to obtain a sliding bearing unit U capable of obtaining good bearing operation and an X-ray tube 1 provided with this sliding bearing unit U.

Fifth Embodiment

Figure 15:
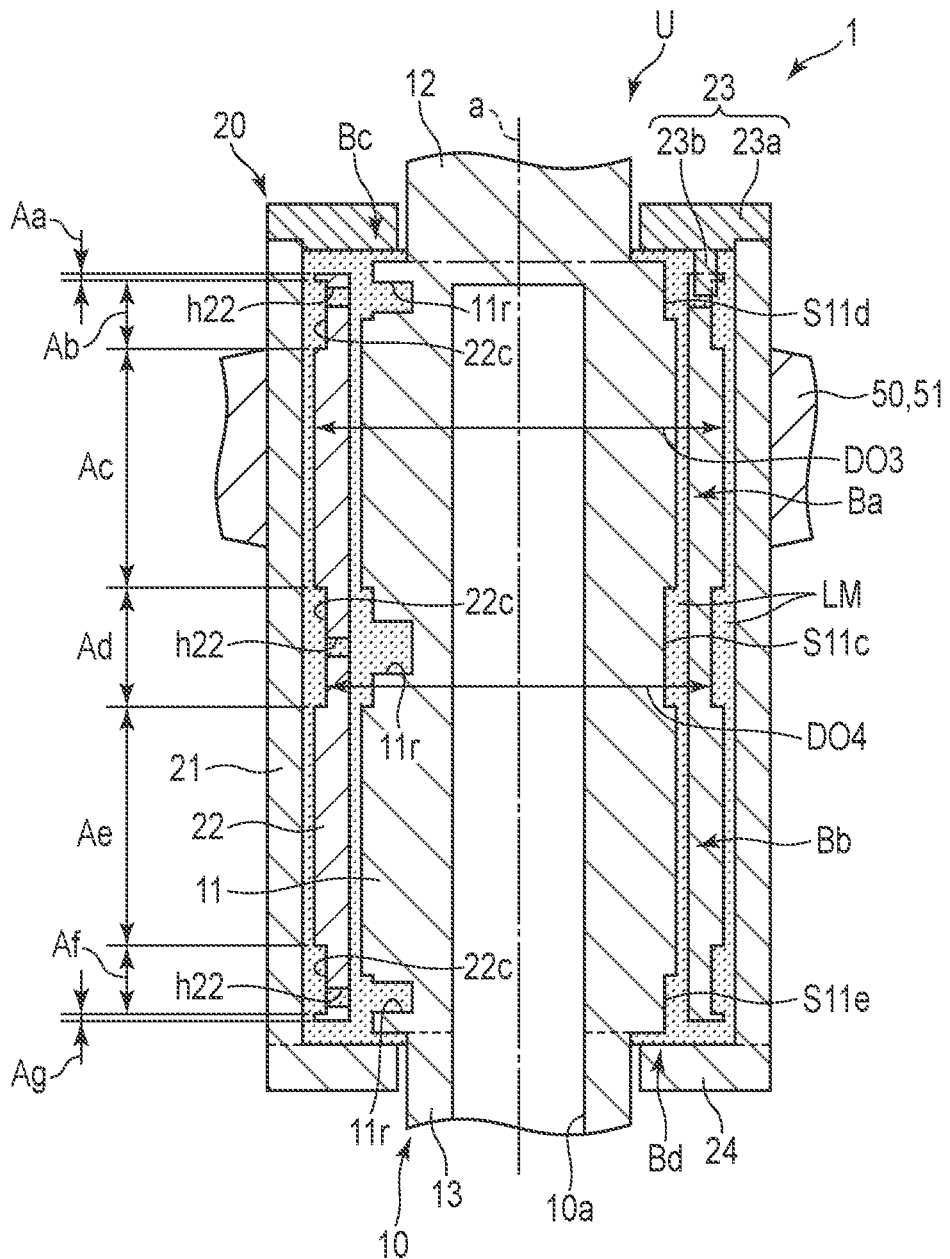
FIG. 15 is an enlarged cross-sectional view showing a part of an X-ray tube assembly according to a fifth embodiment.

Next, an X-ray tube assembly according to a fifth embodiment will be described. An X-ray tube 1 has the same configuration as that of the above third embodiment, except for the configurations described in the present fifth embodiment. FIG. 15 is an enlarged cross-sectional view showing a part of the X-ray tube assembly according to the present fifth embodiment.

As shown in FIG. 15, a second cylinder 22 may have a plurality of areas having different outer diameter dimensions. The inner diameter of a first cylinder 21 is uniform over the entire length. From the above, there are a plurality of areas Aa, Ab, Ac, Ad, Ae, Af, and Ag having different gaps between the first cylinder 21 and the second cylinder 22 in the direction along a rotation axis a. The second cylinder 22 has a plurality of concave surfaces 22c. The plurality of concave surfaces 22c are formed on the outer peripheral surface of the second cylinder 22 over the entire circumference in each of the areas Ab, Ad, and Af. The concave surface 22c is formed by being recessed toward the rotation axis a side.

A circulation hole h22 is open to the concave surface 22c.

Here, a gap between the first cylinder 21 and the second cylinder 22 in each of the areas Aa and Ag is g1, a gap between the first cylinder 21 and the second cylinder 22 in each of the areas Ac and Ae is g2, and a gap between the first cylinder 21 and the second cylinder 22 in each of the areas Ab, Ad, and Af is g3.

Whereupon, $g1 \leq g2 < g3$ is established. In the present fifth embodiment, $g1=g2$, but may also be $g1<g2$. This allows the positions of the first cylinder 21 and the second cylinder 22 to be aligned in the areas Aa and Ag. The areas Ac and Ae can form a path for transferring heat from the first cylinder 21 to the second cylinder 22. The area Ab, Ad, and Af can function as a reservoir to accommodate liquid metal LM.

Note that $g2<g3=g1$ may also be established. In other words, the outer diameter of the second cylinder 22 in each of the areas Aa and Ag may be identical to the outer diameter of the second cylinder 22 in each of the areas Ab, Ad, and Af.

The second cylinder 22 has an outer diameter DO3 in the area Ac and an outer diameter DO4 in the area Ad. The outer diameter DO3 is also the outer diameter of an area of the second cylinder 22 surrounded by an anode target 50. The outer diameter DO4 is also the outer diameter of an area of the second cylinder 22 adjacent to the area Ac (an area surrounded by the anode target 50). The outer diameter DO3 is larger than the outer diameter DO4.

According to the fifth embodiment configured as described above, the same effect as that of the above third embodiment can be obtained. It is possible to obtain a sliding bearing unit U capable of obtaining good bearing operation and an X-ray tube 1 provided with this sliding bearing unit U.

Sixth Embodiment

Figure 16:
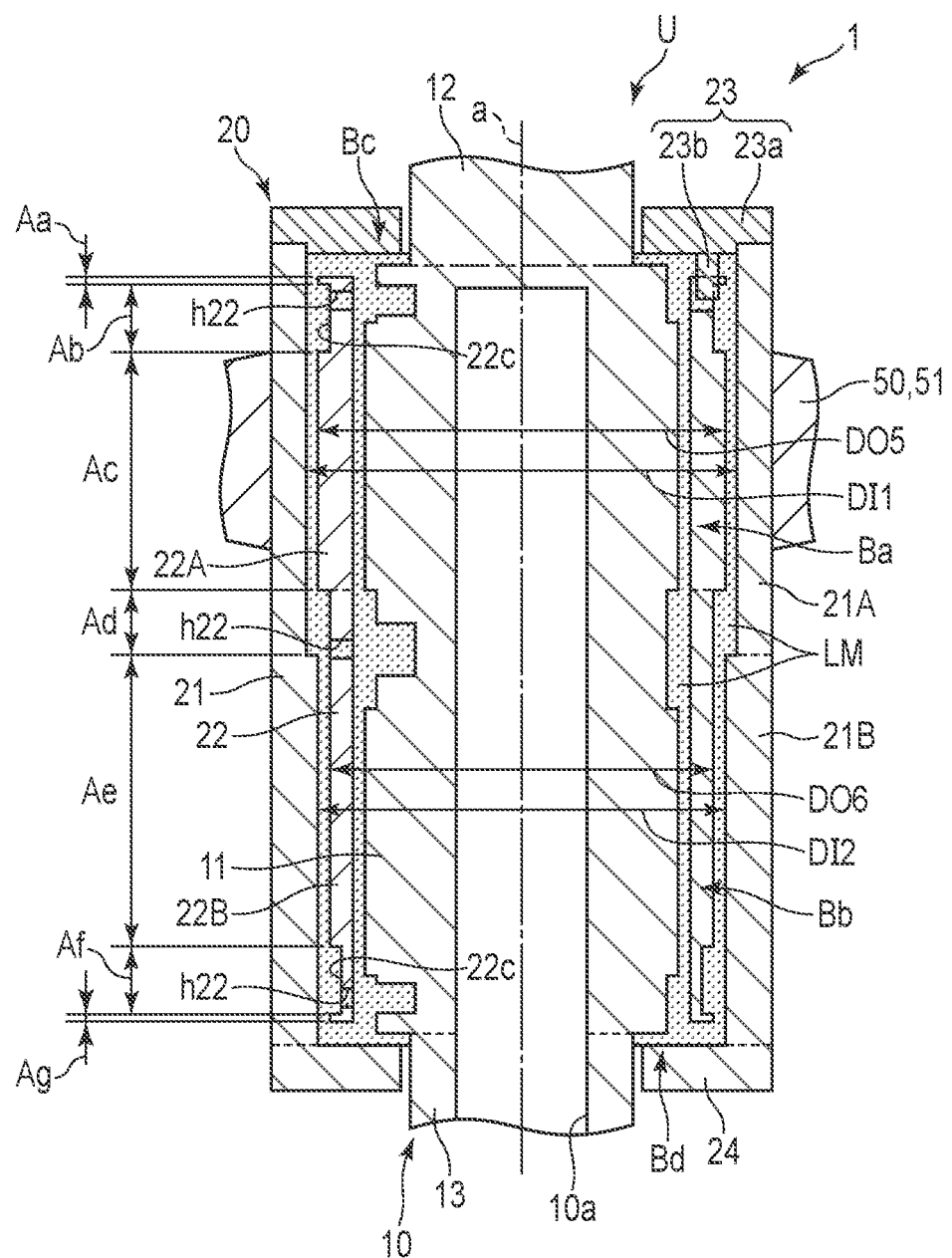
FIG. 16 is an enlarged cross-sectional view showing a part of an X-ray tube assembly according to a sixth embodiment.

Next, an X-ray tube assembly according to a sixth embodiment will be described. An X-ray tube 1 has the same configuration as the above fifth embodiment except for the configurations described in the present sixth embodiment. FIG. 16 is an enlarged cross-sectional view showing a part of the X-ray tube assembly according to the present sixth embodiment.

As shown in FIG. 16, a first cylinder 21 has a plurality of portions having different inner diameter dimensions. The first cylinder 21 has a first portion 21A having an inner diameter DI1 and a second portion 21B having an inner diameter DI2. The inner diameter DI1 is larger than the inner diameter DI2. The first portion 21A is located in areas Aa, Ab, Ac and Ad. The second portion 21B is located in areas Ae, Af, and Ag.

The second cylinder 22 has a plurality of portions having different outer diameter dimensions. The second cylinder 22 comprises a first portion 22A having an outer diameter DO5 and a second portion 22B having an outer diameter DO6 that is smaller than the outer diameter DO5. The first portion 22A is located in the areas Aa, Ab, and Ac. The second portion 22B is located in the areas Ad, Ae, Af, and Ag.

Here, a gap between the first cylinder 21 and the second cylinder 22 in each of the areas Aa and Ag is g1, a gap between the first cylinder 21 and the second cylinder 22 in each of the areas Ac and Ae is g2, and a gap between the first cylinder 21 and the second cylinder 22 in each of the areas Ab, Ad, and Af is g3.

Whereupon, g1≤g2<g3 is established. In the present sixth embodiment, g1=g2, but may also be g1<g2. This allows the positions of the first cylinder 21 and the second cylinder 22 to be aligned in the areas Aa and Ag. The areas Ac and Ae can form a path for transferring heat from the first cylinder 21 to the second cylinder 22. The areas Ab, Ad, and Af can function as a reservoir to accommodate a liquid metal LM.

As described above, the first cylinder 21 has the first portion 21A with a relatively large inner diameter DI1, and the second cylinder 22 has the second portion 22B with a relatively small outer diameter DO6. Therefore, when assembling to a sliding bearing unit U, the second cylinder 22 can be easily inserted into an integral body of the first cylinder 21 and a second restriction member 24.

According to the sixth embodiment configured as described above, the same effect as that of the above fifth embodiment can be obtained. Since the first portion 21A has a relatively large inner diameter DI1, the liquid metal LM can be less likely depleted in the gap between the first portion 21A and the first portion 22A. In other words, in the area surrounded by an anode target 50, the liquid metal LM can be less likely depleted in the gap between the first cylinder 21 and the second cylinder 22. It is possible to obtain a sliding bearing unit U capable of obtaining good bearing operation and an X-ray tube 1 provided with this sliding bearing unit U.

Note that, unlike the above sixth embodiment, the inner diameter of the first cylinder 21 may be uniformly formed over the entire length. In other words, the first cylinder 21 may have the inner diameter DI1 over the entire length. Even in that case, the same effect as that of the above sixth embodiment can be obtained.

Seventh Embodiment

Figure 17:
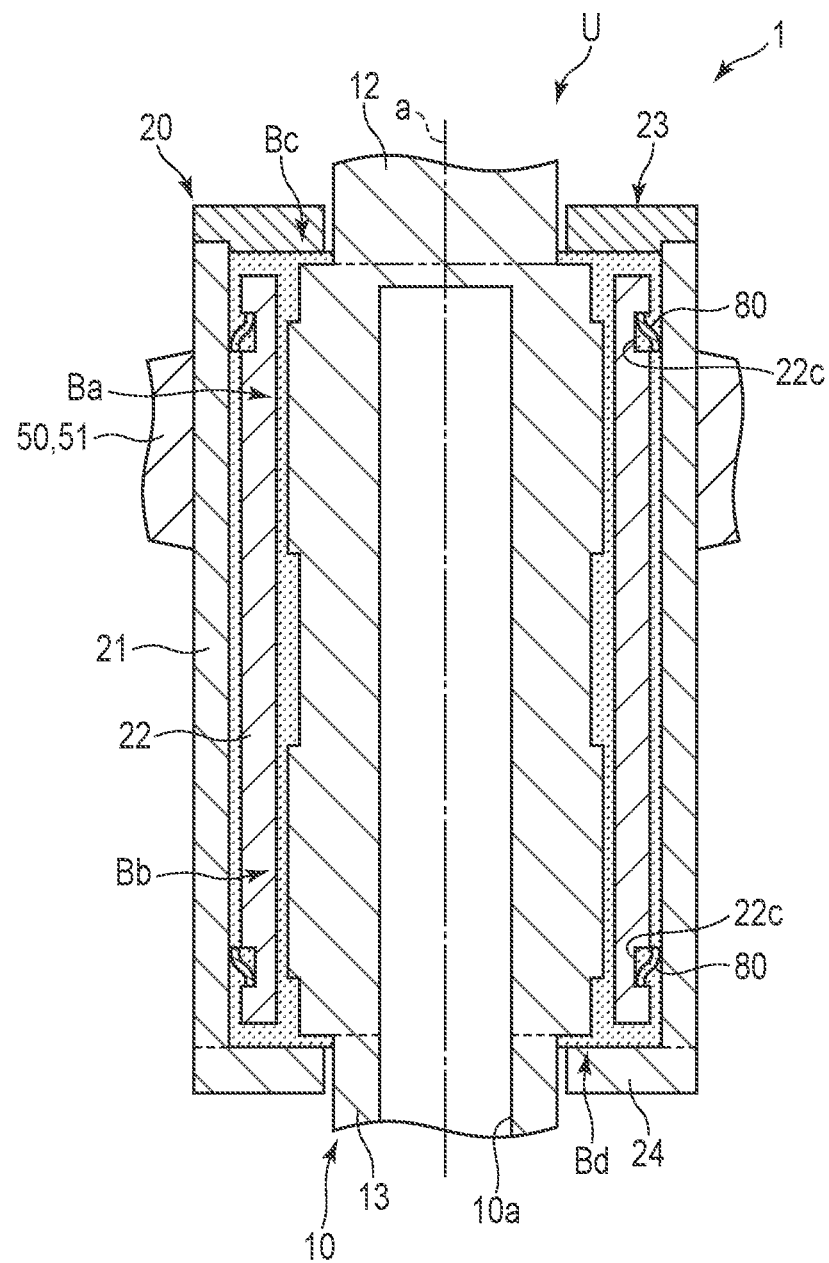
FIG. 17 is an enlarged cross-sectional view showing a part of an X-ray tube assembly according to a seventh embodiment.

Next, an X-ray tube assembly according to a seventh embodiment will be described. An X-ray tube 1 has the same configuration as that of the above first embodiment, except for the configurations described in the present seventh embodiment. FIG. 17 is an enlarged cross-sectional view showing a part of the X-ray tube assembly according to the present seventh embodiment. Note that, in FIG. 17, for convenience, a recess 22r and a second member 23b are not shown.

As shown in FIG. 17, a second cylinder 22 has a plurality of concave surfaces 22c. The plurality of concave surfaces 22c are formed on the outer peripheral surface of the second cylinder 22 over the entire circumference. The concave surface 22c is formed by being recessed toward a rotation axis a side.

The X-ray tube 1 has an annular spring 80. In the seventh embodiment, the X-ray tube 1 has two springs 80. The spring 80 is located between a first cylinder 21 and the second cylinder 22, an end portion on the inner side presses the concave surface 22c, and an end portion on the outer side presses the inner peripheral surface of the first cylinder 21.

The gap between the concave surface 22c and the inner peripheral surface of the first cylinder 21 can function as a reservoir for accommodating a liquid metal LM, or can be used as a space for arranging the spring 80. Thereby, for example, the coaxiality between the first cylinder 21 and the second cylinder 22 can be maintained.

According to the seventh embodiment configured as described above, the same effect as that of the above first embodiment can be obtained. It is possible to obtain a sliding bearing unit U capable of obtaining good bearing operation and an X-ray tube 1 provided with this sliding bearing unit U.

Eighth Embodiment

Figure 18:
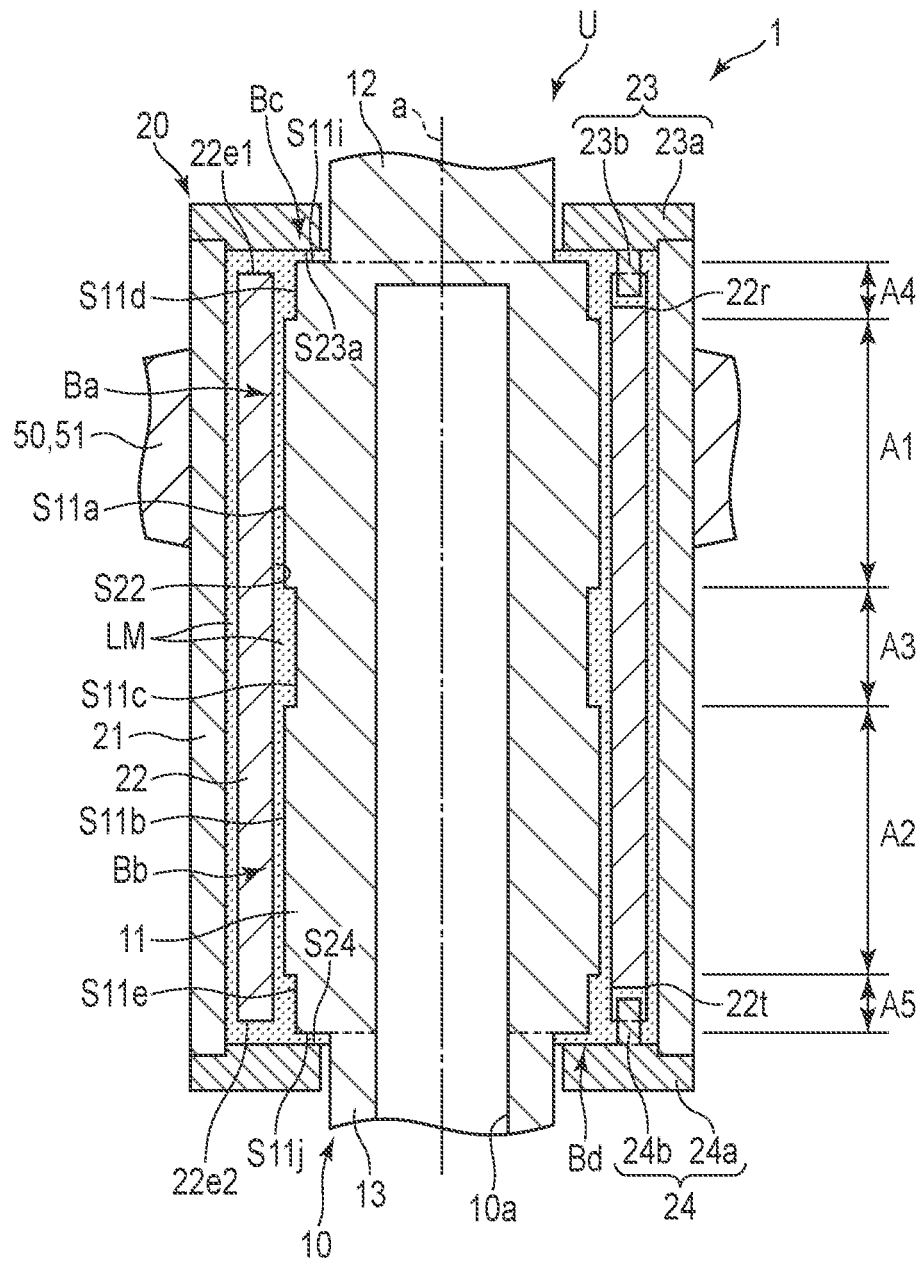
FIG. 18 is an enlarged cross-sectional view showing a part of an X-ray tube assembly according to an eighth embodiment.

Next, an X-ray tube assembly according to an eighth embodiment will be described. An X-ray tube 1 has the same configuration as that of the above first embodiment, except for the configurations described in the present eighth embodiment. FIG. 18 is an enlarged cross-sectional view showing a part of the X-ray tube assembly according to the present eighth embodiment.

As shown in FIG. 18, the operation of a second cylinder 22 may be further restricted by a second restriction member 24.

The second cylinder 22 further includes one or more recesses 22t. In the present eighth embodiment, the second cylinder 22 has three recesses 22t. These recesses 22t are located at intervals from each other in the circumferential direction. Each recess 22t opens in a second end surface 22e2 and is recessed in the direction along a rotation axis a.

The second restriction member 24 is configured in the same manner as the first restriction member 23 shown in FIG. 9 and the like. The second restriction member 24 has a first member 24a and one or more second members 24b. In the present eighth embodiment, the second restriction member 24 has three second members 24b. The first member 24a has an annular shape and is fixed to a first cylinder 21.

The first member 24a faces the second end surface 22e2 of the second cylinder 22. Thereby, the first member 24a can restrict the movement of the second cylinder 22 in a direction along the rotation axis a. The first member 24a includes a thrust bearing surface S24. The thrust bearing surface S24 is located on the inner peripheral side of the first member 24a and has an annular shape.

Each second member 24b protrudes from the first member 24a in a direction along the rotation axis a. The second member 24b is provided in a one-to-one correspondence with the recess 22t of the second cylinder 22. Each second member 24b is fitted in the recess 22t of the second cylinder 22. In the present eighth embodiment, the second member 24b can be fitted into the recess 22t without using a tightening fit. However, the second member 24b may also be fitted into the recess 22t by using the tightening fit. The second member 24b is configured to restrict the operation of the second cylinder 22 together with the recess 22t of the second cylinder 22.

According to the eighth embodiment configured as described above, the same effect as that of the above first embodiment can be obtained. It is possible to obtain a sliding bearing unit U capable of obtaining good bearing operation and an X-ray tube 1 provided with this sliding bearing unit U.

Ninth Embodiment

Figure 19:
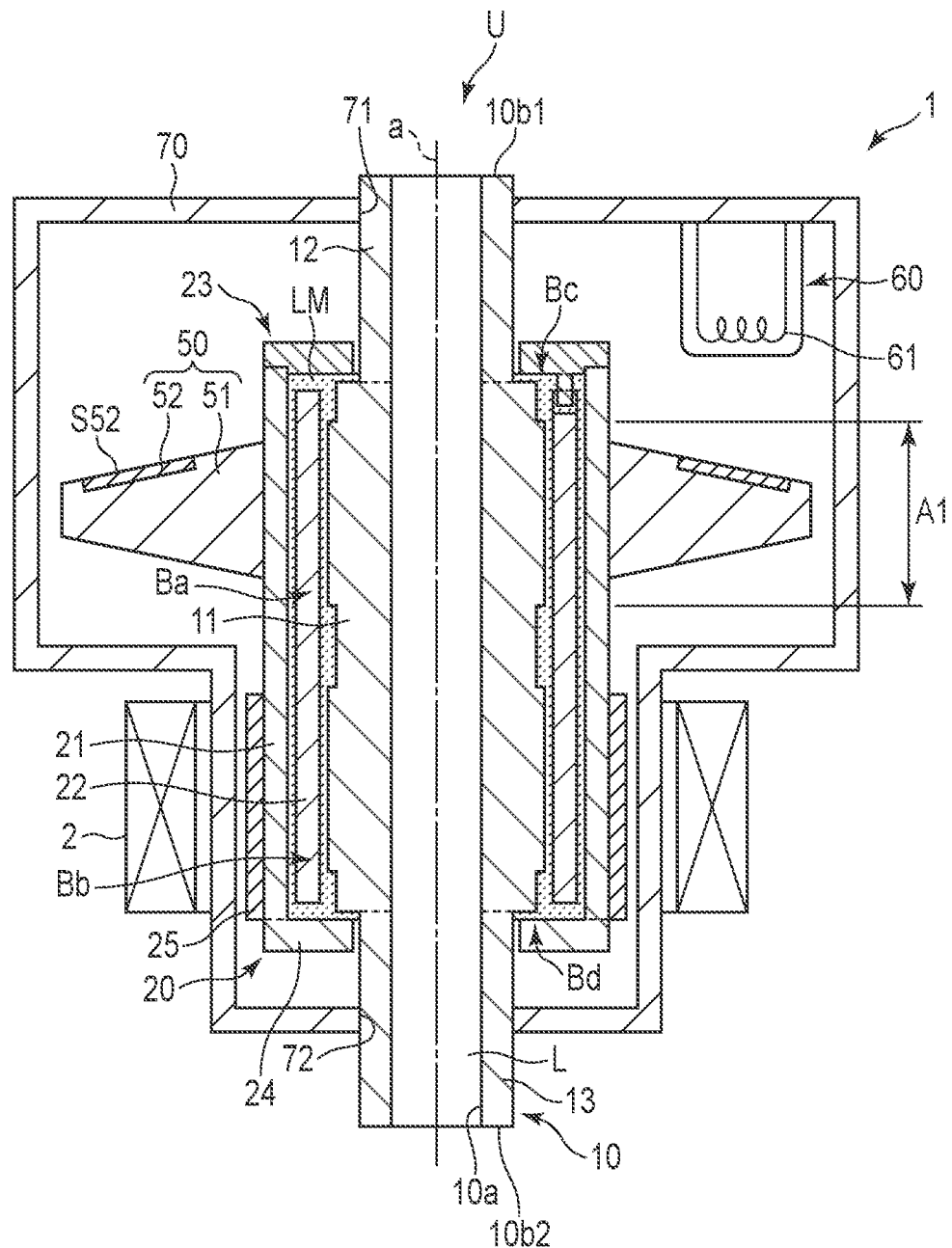
FIG. 19 is a cross-sectional view showing an X-ray tube assembly according to a ninth embodiment.

Next, an X-ray tube assembly according to a ninth embodiment will be described. An X-ray tube 1 has the same configuration as that of the above first embodiment, except for the configurations described in the present ninth embodiment. FIG. 19 is a cross-sectional view showing the X-ray tube assembly according to the present ninth embodiment.

As shown in FIG. 19, the X-ray tube 1 is formed without a tube portion 40, an annulus portion 16, and a tube portion 45. A heat transfer portion 10a is a heat transfer hole. The heat transfer portion 10a is open to both a first bottom surface 10b1 and a second bottom surface 10b2, extends along a rotation axis a, and penetrates a stationary shaft 10. A cooling fluid (coolant L) flows into the stationary shaft 10 from the first bottom surface 10b1 side and flows out from the second bottom surface 10b2 side to the outside of the stationary shaft 10. Alternatively, the cooling fluid (coolant L) flows into the stationary shaft 10 from the second bottom surface 10b2 side and flows out from the first bottom surface 10b1 side to the outside of the stationary shaft 10.

According to the ninth embodiment configured as described above, the same effect as that of the above first embodiment can be obtained. It is possible to obtain a sliding bearing unit U capable of obtaining good bearing operation and an X-ray tube 1 provided with this sliding bearing unit U.

Tenth Embodiment

Next, an X-ray tube assembly according to a tenth embodiment will be described. An X-ray tube 1 has the same configuration as that of the above first embodiment, except for the configurations described in the present tenth embodiment. FIG. 20 is a cross-sectional view showing the X-ray tube assembly according to the present tenth embodiment.

As shown in FIG. 20, the X-ray tube 1 adopts a single-ended support bearing structure. An envelope 70 fixes a second small diameter portion 13 of a stationary shaft 10. That is, the second small diameter portion 13 functions as a cantilever support portion of the bearing.

The stationary shaft 10 comprises a large diameter portion 11 and the second small diameter portion 13, and is configured without a first small diameter portion 12. A first bottom surface 10b1 is located on the large diameter portion 11, and a thrust bearing surface S11i is located on the first bottom surface 10b1. A first restriction member 23 is formed in a disk shape and liquid-tightly closes one end side of a first cylinder 21. The first restriction member 23 has a thrust bearing surface S23a facing the thrust bearing surface S11i.

In the present tenth embodiment, a second cylinder 22 has a recess 22t, and a second restriction member 24 has a first member 24a and a second member 24b. The second restriction member 24 is detachably fixed to the first cylinder 21 using, for example, a screw. The operation of the second cylinder 22 is restricted so that it does not rotate relative to the first cylinder 21.

According to the tenth embodiment configured as described above, the same effect as that of the above first embodiment can be obtained. It is possible to obtain a sliding bearing unit U capable of obtaining good bearing operation and an X-ray tube 1 provided with this sliding bearing unit U.

Eleventh Embodiment

Figure 21:
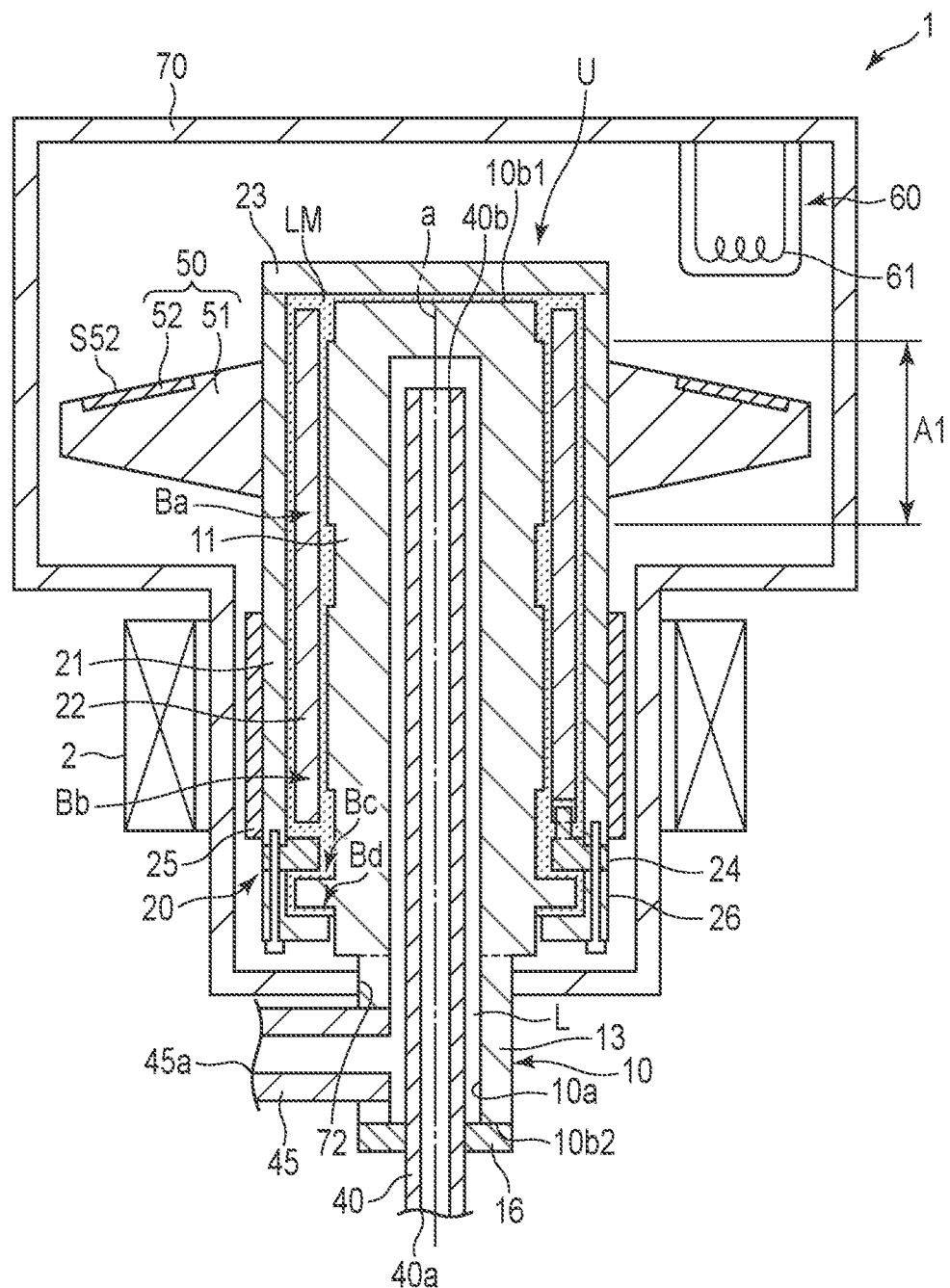
FIG. 21 is a cross-sectional view showing an X-ray tube assembly according to an eleventh embodiment.

Next, an X-ray tube assembly according to an eleventh embodiment will be described. An X-ray tube 1 has the same configuration as the above tenth embodiment except for the configurations described in the present eleventh embodiment. FIG. 21 is a cross-sectional view showing the X-ray tube assembly according to the present eleventh embodiment.

As shown in FIG. 21, a stationary shaft 10 further comprises a flange portion 17. The flange portion 17 is located on the outer peripheral surface side of a large diameter portion 11 and is integrally formed with the large diameter portion 11.

A rotor 20 further comprises a bearing member 26. The bearing member 26 is formed by a tubular portion surrounding the flange portion 17 and an annular portion facing the flange portion 17 in a direction along a rotation axis a being integrally formed. For example, a second restriction member 24, together with the bearing member 26, is detachably fixed to a first cylinder 21 using screws. Note that the configuration of the rotor 20 and the method of assembling a sliding bearing unit U are not limited to the example shown in FIG. 21, and can be variously modified.

The second restriction member 24 and the flange portion 17 form a dynamic pressure thrust sliding bearing Bc together with a liquid metal LM. On the other hand, the bearing member 26 and the flange portion 17 also form a dynamic pressure thrust sliding bearing Bd together with the liquid metal LM.

According to the eleventh embodiment configured as described above, the same effect as that of the above tenth embodiment can be obtained. It is possible to obtain a sliding bearing unit U capable of obtaining good bearing operation and an X-ray tube 1 provided with this sliding bearing unit U.

Twelfth Embodiment

Figure 22:
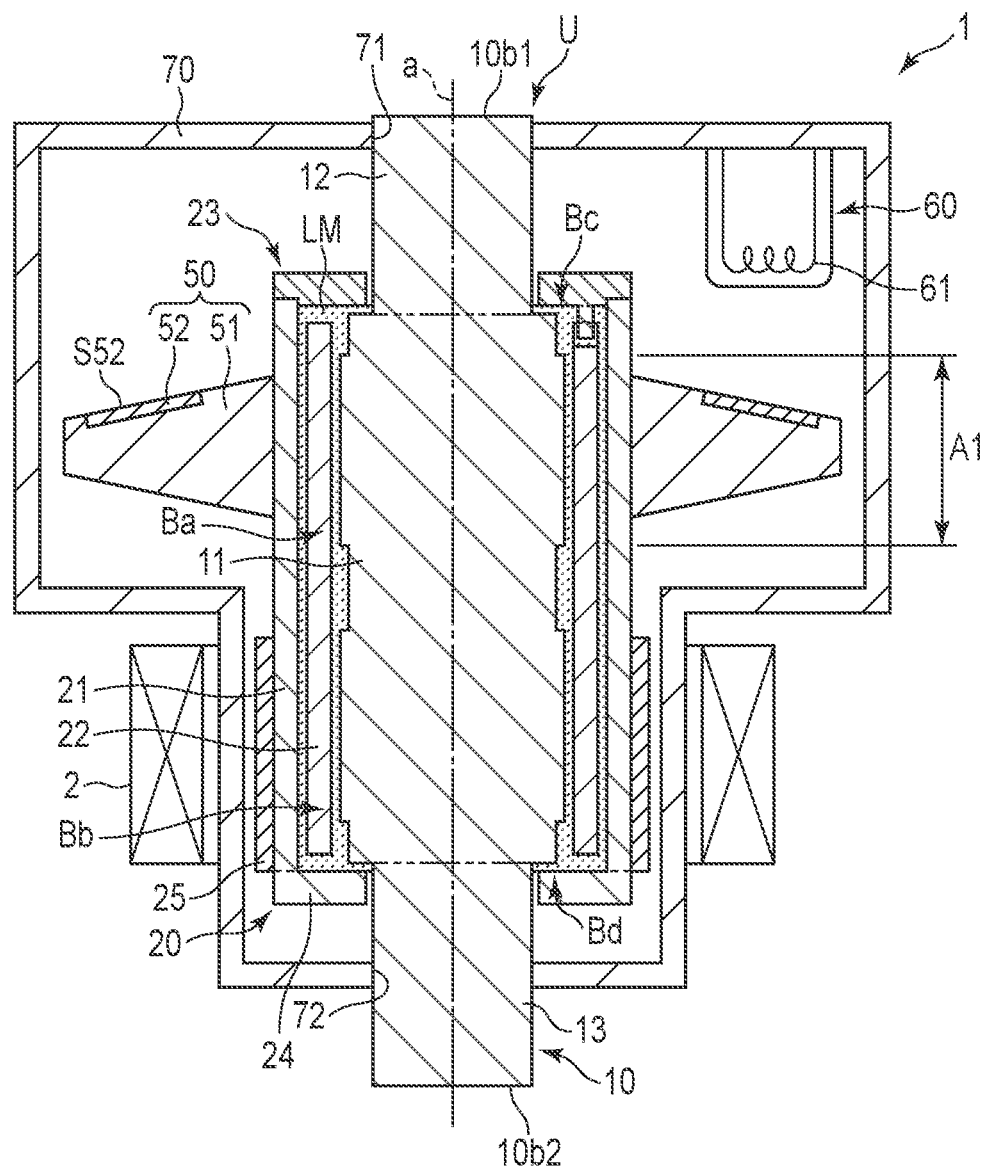
FIG. 22 is a cross-sectional view showing an X-ray tube assembly according to a twelfth embodiment.

Next, an X-ray tube assembly according to a twelfth embodiment will be described. An X-ray tube 1 has the same configuration as the above first embodiment, except for the configurations described in the present twelfth embodiment. FIG. 22 is a cross-sectional view showing the X-ray tube assembly according to the present twelfth embodiment.

As shown in FIG. 22, a stationary shaft 10 is formed in a columnar shape and may be a solid member. The stationary shaft 10 can be cooled at a portion of the stationary shaft 10 exposed to the outside of an envelope 70.

According to the twelfth embodiment configured as described above, the same effect as that of the above tenth embodiment can be obtained. It is possible to obtain a sliding bearing unit U capable of obtaining good bearing operation and an X-ray tube 1 provided with this sliding bearing unit U.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sliding bearing unit comprising:
    a stationary shaft that extends along a rotation axis and includes a first radial bearing surface on an outer peripheral surface;
    a rotor that is rotatable around the stationary shaft; and
    a lubricant,
    wherein
    the rotor includes:
        a first cylinder extending along the rotation axis and located surrounding the stationary shaft, wherein the first cylinder has a tubular shape; and
        a second cylinder extending along the rotation axis and located between the stationary shaft and the first cylinder, wherein the second cylinder is formed in a tubular shape, wherein the second cylinder includes a second radial bearing surface on an inner peripheral surface, and wherein the second radial bearing surface is restricted so as not to rotate relative to the first cylinder, and
    the lubricant is filled in a plurality of gaps between the stationary shaft, the first cylinder, and the second cylinder, and the lubricant forms a dynamic pressure radial sliding bearing together with the first radial bearing surface and the second radial bearing surface.

2. The sliding bearing unit of claim 1, wherein
    the second cylinder is movable to a position eccentric with respect to each of the stationary shaft and the first cylinder.

3. The sliding bearing unit of claim 1, wherein
    the rotor further includes a first restriction member,
    the second cylinder includes a first end surface located at an end of a direction along the rotation axis and a recess opened in the first end surface and recessed in a direction along the rotation axis,
    the first restriction member includes:
        a first member fixed to the first cylinder, facing the first end surface of the second cylinder, and restricting movement of the second cylinder in a direction along the rotation axis; and
        a second member protruding from the first member in a direction along the rotation axis, fitted into the recess, and configured to restrict operation of the second cylinder together with the recess,
    the stationary shaft includes a first thrust bearing surface,
    the first member includes a second thrust bearing surface facing the first thrust bearing surface, and
    the lubricant is filled in a plurality of gaps between the stationary shaft, the first cylinder, and the second cylinder, and the first restriction member, and the lubricant forms a dynamic pressure thrust sliding bearing together with the first thrust bearing surface and the second thrust bearing surface.

4. The sliding bearing unit of claim 1, wherein
    the second cylinder includes a circulation hole that is connected to a gap between the stationary shaft and the second cylinder and a gap between the first cylinder and the second cylinder, the circulation hole configuring a circulation path for the lubricant, and
    the circulation hole penetrates from an outer peripheral surface to the inner peripheral surface of the second cylinder.

5. The sliding bearing unit of claim 1, wherein
    the second cylinder is made of a material different from that of the first cylinder.

6. The sliding bearing unit of claim 1, wherein
    the second cylinder is made of the same material as the stationary shaft.

7. The sliding bearing unit of claim 1, wherein
    the first cylinder is made of the same material as the stationary shaft.

8. The sliding bearing unit of claim 3, wherein
    the rotor further includes a second restriction member,
    the second cylinder includes a second end surface located at an end of a direction along the rotation axis and on an opposite side of the first end surface,
    the second restriction member is fixed to the first cylinder, faces the second end surface of the second cylinder, and is configured to restrict movement of the second cylinder in a direction along the rotation axis, and
    a gap between the first end surface and the first restriction member and a gap between the second end surface and the second restriction member are connected to a gap between the stationary shaft and the second cylinder and a gap between the first cylinder and the second cylinder, respectively, and configure a circulation path for the lubricant.

9. A rotating anode X-ray tube comprising:
    a sliding bearing unit comprising a stationary shaft extending along a rotation axis and including a first radial bearing surface on an outer peripheral surface, a rotor rotatable around the stationary shaft, and a lubricant;
    an anode target;
    a cathode arranged facing the anode target; and
    an envelope housing the sliding bearing unit, the anode target, and the cathode, and fixing the stationary shaft,
    wherein
    the rotor includes:
        a first cylinder extending along the rotation axis and located surrounding the stationary shaft, wherein the first cylinder has a tubular shape; and
        a second cylinder extending along the rotation axis and located between the stationary shaft and the first cylinder, wherein the second cylinder is formed in a tubular shape, wherein the second cylinder includes a second radial bearing surface on an inner peripheral surface, and wherein the second radial bearing surface is restricted so as not to rotate relative to the first cylinder,
    the lubricant is filled in a plurality of gaps between the stationary shaft, the first cylinder, and the second cylinder, wherein the lubricant forms a dynamic pressure radial sliding bearing together with the first radial bearing surface and the second radial bearing surface, and the anode target surrounds an outer peripheral surface of the first cylinder, and is fixed to the first cylinder.

10. The rotating anode X-ray tube of claim 9, wherein the second cylinder is movable to a position eccentric to each of the stationary shaft and the first cylinder.

11. The rotating anode X-ray tube of claim 9, wherein the rotor further includes a first restriction member, the second cylinder includes a first end surface located at an end of a direction along the rotation axis, and a recess opened in the first end surface and recessed in a direction along the rotation axis, the first restriction member includes:
 a first member fixed to the first cylinder, facing the first end surface of the second cylinder, and restricting movement of the second cylinder in a direction along the rotation axis; and
 a second member protruding from the first member in a direction along the rotation axis, fitted into the recess, and configured to restrict operation of the second cylinder together with the recess, the stationary shaft includes a first thrust bearing surface, the first member includes a second thrust bearing surface facing the first thrust bearing surface, and the lubricant is filled in a plurality of gaps between the stationary shaft, the first cylinder, the second cylinder, and the first restriction member, and the lubricant forms a dynamic pressure thrust sliding bearing together with the first thrust bearing surface and the second thrust bearing surface.

12. The rotating anode X-ray tube of claim 9, wherein the second cylinder includes a circulation hole connected to a gap between the stationary shaft and the second cylinder and a gap between the first cylinder and the second cylinder, the circulation hole configuring a circulation path for the lubricant, and the circulation hole penetrates from an outer peripheral surface to the inner peripheral surface of the second cylinder.

13. The rotating anode X-ray tube of claim 9, wherein the second cylinder includes:
 a first outer diameter in a first area surrounded by the anode target; and
 a second outer diameter in a second area adjacent to the first area in a direction along the rotation axis, and the first outer diameter is larger than the second outer diameter.

14. The rotating anode X-ray tube of claim 9, wherein the second cylinder is made of a material different from that of the first cylinder.

15. The rotating anode X-ray tube of claim 9, wherein the second cylinder is made of the same material as the stationary shaft.

16. The rotating anode X-ray tube of claim 9, wherein the first cylinder is made of the same material as the stationary shaft.

17. The rotating anode X-ray type of claim 9, wherein the stationary shaft further includes:
 a first bottom surface;
 a second bottom surface on an opposite side of the first bottom surface in a direction along the rotation axis; and
 a heat transfer portion extending along the rotation axis, opened in at least one of the first bottom surface and the second bottom surface, and transferring heat to a cooling fluid flowing therein.

18. The rotating anode X-ray tube of claim 9, wherein the stationary shaft further includes a concave surface arranged side by side with the first radial bearing surface in a direction along the rotation axis, and the concave surface is located on the rotation axis side with respect to a virtual extension surface of the first radial bearing surface.

19. The rotating anode X-ray tube of claim 9, wherein the stationary shaft further includes:
 an accommodating portion provided therein to accommodate the lubricant; and
 a circulation hole penetrating from the accommodating portion to the outer peripheral surface.

20. The rotating anode X-ray tube of claim 11, wherein the rotor further includes a second restriction member, the second cylinder includes a second end surface located at an end of a direction along the rotation axis and on an opposite side of the first end surface, the second restriction member is fixed to the first cylinder, faces the second end surface of the second cylinder, and is configured to restrict movement of the second cylinder in a direction along the rotation axis, and a gap between the first end surface and the first restriction member and a gap between the second end surface and the second restriction member are connected to a gap between the stationary shaft and the second cylinder and a gap between the first cylinder and the second cylinder, respectively, and configure a circulation path for the lubricant.

21. The rotating anode X-ray tube of claim 13, wherein the first cylinder includes:
 a first inner diameter in the first area; and
 a second inner diameter in the second area, and the first inner diameter is larger than the second inner diameter.

22. The rotating anode X-ray tube of claim 13, wherein the radial sliding bearing is located in the first area.

23. The rotating anode X-ray tube of claim 17, wherein the heat transfer portion is located in a first area surrounded by the anode target.

\* \* \* \* \*